(12) United States Patent
Schimmelpfeng et al.

(10) Patent No.: US 7,924,732 B2
(45) Date of Patent: Apr. 12, 2011

(54) QUALITY OF SERVICE IN IT INFRASTRUCTURES

(75) Inventors: Joern Schimmelpfeng, Gaeufelden (DE); Frank Nitsch, Herrenberg (DE); Martin Tischhaeuser, Wildberg (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 1338 days.

(21) Appl. No.: 11/109,285

(22) Filed: Apr. 19, 2005

(65) Prior Publication Data

US 2006/0245369 A1    Nov. 2, 2006

(51) Int. Cl.
H04L 12/26 (2006.01)

(52) U.S. Cl. ...................................... 370/252

(58) Field of Classification Search .................. 370/230, 370/231, 232–235, 252–253, 229
See application file for complete search history.

(56) References Cited

U.S. PATENT DOCUMENTS

| | | | |
|---|---|---|---|
| 5,583,792 A * | 12/1996 | Li et al. ........................... | 709/224 |
| 6,502,131 B1 * | 12/2002 | Vaid et al. ...................... | 709/224 |
| 6,631,122 B1 * | 10/2003 | Arunachalam et al. ....... | 370/332 |
| 6,678,250 B1 * | 1/2004 | Grabelsky et al. ............ | 370/241 |
| 6,850,525 B2 * | 2/2005 | Mitsumori et al. ....... | 370/395.52 |
| 6,917,589 B2 * | 7/2005 | Berenbaum ................... | 370/232 |
| 7,197,557 B1 * | 3/2007 | Asar et al. ..................... | 709/224 |
| 7,307,954 B1 * | 12/2007 | Strandberg et al. ........... | 370/235 |
| 7,430,179 B2 * | 9/2008 | Towns-von Stauber et al. ................ | 370/252 |
| 2002/0019843 A1 * | 2/2002 | Killian et al. ................. | 709/102 |
| 2002/0129158 A1 * | 9/2002 | Zhang et al. .................. | 709/234 |
| 2004/0071095 A1 * | 4/2004 | Raisanen ....................... | 370/252 |
| 2004/0205752 A1 * | 10/2004 | Chou et al. .................... | 718/100 |
| 2005/0013244 A1 * | 1/2005 | Parlos ........................... | 370/229 |
| 2006/0050633 A1 * | 3/2006 | Lee et al. ...................... | 370/229 |
| 2006/0104218 A1 * | 5/2006 | Kako ............................. | 370/252 |
| 2006/0218271 A1 * | 9/2006 | Kasslin et al. ................ | 709/224 |

OTHER PUBLICATIONS

N. Muller, "Focus on OpenView", CBM Books, 1995, pp. 1-20.
H. Hegering, et al., "Integrated Management of Networked Systems", Morgan Kaufmann Publishers, 1998, pp. 83-93.
J. Blommers, "OpenView Network Node Manager", Prentice Hall, 2001, pp. vi-xiii, pp. 119-174.
J. Lee, et al., "Integrating Service Level Agreements", Wiley Publishing Inc., 2002, pp. 3-25, 44-46, 49-52, and 315-319.

* cited by examiner

Primary Examiner — Ricky Ngo
Assistant Examiner — Ben H Liu

(57) ABSTRACT

A method of determining quality of service (QoS) in an IT infrastructure on the basis of QoS-related data received from data sources for these QoS-related data, wherein the data from the data sources regularly arrive in real-time, but data from one or more of the data sources may occasionally be delayed. On the basis of the regular data, a real-time indication of the quality of service is calculated in a first process. This indication is possibly inaccurate since delayed data is not included. After the receipt of delayed data, a delayed, but more accurate indication of the quality of service is calculated in a second concurrent process on the basis of regular information, which comprises at least one of regular data and information derived from it, and the delayed data.

18 Claims, 14 Drawing Sheets

◎ : STORED REGULAR INFORMATION

QUALITY OF SERVICE IN IT INFRASTRUCTURES

FIELD OF THE INVENTION

The present invention relates generally to quality of service in information technological (IT) infrastructures, and for example, to methods, computer systems, computer program products and propagated signals for determining quality of service in an IT infrastructure.

BACKGROUND OF THE INVENTION

Nowadays, as information systems become ubiquitous and companies and organizations of all sectors become more and more dependent on their computing resources, the requirement for the availability of the hardware and software components of an IT infrastructure (basically a computer or telecommunication network, including applications and services based on it), is increasing while the complexity of IT infrastructures is growing. An IT infrastructure often comprises a diversity of systems, such as cables, repeaters, switches, routers, access points, work stations, servers, storage systems, some of which host operating systems, middleware and applications. The management of all these systems is becoming important, not only for large organizations, but also for medium-sized and small ones. A management of networked systems includes all the measures necessary to ensure the effective and efficient operation of a system and its resources in accordance with an organization's goals (see, for example, H. Hegering et al.: "Integrated Management of Networked Systems", Morgan Kaufmann Publishers, 1998, pp. 83-93).

Networks and services related to them can generally be approached from a technical perspective or a business-oriented perspective which are, however, closely related. The technical perspective pertains to the technical aspects of network management, whereas the business-oriented perspective nowadays mainly deals with service level agreements (SLAs) between network providers and customers (see, for example, J. Lee et al.: "Integrating Service Level Agreements", Wiley Publishing, Inc., 2002, pp. 3-25). The interrelation between them is that the quality of a service (QoS) delivered by the provider typically depends on the technical design, functioning and performance of the underlying IT infrastructure, and that measures of the QoS which reflect commitments made in an SLA are normally based on technical network management tools. Such QoS measures allow continuous tracking of the service being delivered and gauging whether service delivery conforms to the agreed-upon SLA.

From the technical point of view, the field of network management may be divided into five areas which are together sometimes called "FCAPS": fault management, configuration management, accounting management, performance management and security management. The objective of fault management is to detect and correct faults quickly to ensure that a high level of availability of a networked system and the services it provides are maintained, whereby faults are defined as a deviation from the prescribed operating goals, system functions, or services. The tasks that have evolved from this objective include: monitoring network and system states, responding and reacting to fault notifications, such as alarms, diagnosing fault causes, establishing error propagation, etc. Configuration management deals with the adaptation of IT systems to operating environments and includes setting parameters, installing new software, expanding old software, attaching devices, making changes to a network topology. Accounting management includes tasks such as name and address administration, granting of authorizations and the accounting services. Performance management can be regarded as a systematic continuation of fault management, since it not only ensures that a communication network or a distributed system just operates but also wants the system to perform well. It deals with data like network throughput, network latency, error rates, storage resources, CPU workload, memory usage, server response time, connection establishment time, etc. Security management refers to the management of security in distributed systems, which contain the resources of a company that are worth protecting.

In order to accomplish these different management tasks, on the one hand, individual management tools (such as response-time testers, trouble-ticket systems, etc.) and, on the other hand, management platforms, such as OpenView by Hewlett-Packard, are available (see, for example, N. Muller: "Focus on OpenView". CBM books, 1995, pp. 1-20; J. Blommers: "OpenView Network Node Manager", Prentice Hall, 2001, pp. vi-xiii). A management platform, such as OpenView by Hewlett-Packard, integrates several management tools and management-related databases, and can typically be customized according to a user's specific installations and needs. In the framework of handling SLAs, fault and performance-related information produced by fault and performance management applications in the form of individual management tools and/or within a management platform (see, e.g., Blommers, pp. 119-174) may be used as QoS measures to track the QoS achieved and to verify the compliance of the QoS with commitments made in an SLA.

From the business perspective, the quality of an IT service provided is what counts, most pronouncedly for businesses which totally rely on IT services, such as e-commerce companies. A service in this context is a more abstract entity which typically is based on a combination of many elements of an IT infrastructure, such as cables, network interconnecting devices, gateways, servers, applications etc. Services are, for example, transport services through a network, name services, e-mail services, Web request-response services, database services, and more specific application services tailored to a company's individual business needs. More and more of such IT functions are outsourced to service providers. The service provider and the customer typically agree upon a contract in which the service provider commits himself to certain quality standards of the delivered service. The quality of a service is often quantified by one or more "service levels", and a contract in which the two parties agree upon a certain (minimum) service quality is therefore called a "service level agreement". Typically, SLAs define certain service level objectives (SLOs) which have to be met by the service provider. Typical SLOs are a certain availability of the IT infrastructure, a certain response time or network latency, a certain packet delivery guarantee, or an (often very complex) combination of such entities. One known type of SLO requires that a certain incident (e.g. a failure) does not occur at all; each single occurrence will then be considered as an SLO violation and may result in a penalty to be paid by the service provider. Another type of SLO pertains to entities cumulated over a period of time, called "compliance period" hereinafter, and requires that the cumulated entities are kept below or above certain thresholds; for example, it requires that the availability of a service is above 99.95% within a calendar month. As mentioned above, the actually delivered QoS is quantitatively determined, e.g. by measured fault and performance-related information produced by fault and performance management applications and, by a comparison of the measured values with the SLOs, it is decided whether the service delivered is compliant with an agreed-upon SLA.

Typically, a service provider committing himself to a service with a higher service level, for instance, a higher availability or shorter response time, can usually charge higher service fees than in the case of a lower service level, e.g. a less extensive availability or a longer response time. On the other hand, a provider guaranteeing a higher service level will either, more likely, fail to comply with the SLA and will thus have a higher risk of paying a penalty or damages, or will have higher operative and investment expenses to achieve the agreed-upon service level without such higher failure risk. A knowledge of the QoS actually delivered by the service provider is normally desired both by the service provider and the customer, during the running compliant periods as well as at the end of these periods.

To this end, an SLA management typically includes visibility and reporting requirements that can be divided into two categories: real time and historical. Real time reporting, for example, enables an IT operator to assess whether a fault is relevant for compliance with an SLA, and, consequently, prioritize counteractive measures. A historical report, at the end of a compliance period, is typically used for reconciliation purposes, i.e. to assess whether the SLA was complied with, to calculate penalties or damages, etc. (see, for example, Lee, pp. 49-52).

SUMMARY OF THE INVENTION

According to a first aspect, a method is provided of determining quality of service (QoS) in an IT infrastructure on the basis of QoS-related data received from data sources for these QoS-related data. The data from the data sources regularly arrive in real-time, but data from one or more of the data sources may occasionally be delayed. The method comprises: calculating, on the basis of the regular data, a real-time indication of the quality of service in a first process, said indication possibly being inaccurate since delayed data is not included; calculating, after the receipt of delayed data, on the basis of regular information, which comprises at least one of regular data and information derived from it, and the delayed data, a delayed, but more accurate indication of the quality of service in a second concurrent process.

According to another aspect, a method is provided of determining quality of service (QoS) in an IT infrastructure on the basis of QoS-related data received from the data sources for these QoS-related data. The data from the data sources regularly arrive in real-time, but data from one or more of the data sources may occasionally be delayed. The method comprises: ascertaining the availability of data sources; calculating, on the basis of the regular data, a real-time indication of the quality of service in a first process, said indication possibly being inaccurate since delayed data is not included; and, in response to a detection that one or more of the data sources are not available, determining which results of the real-time calculation are affected by the detected data-source non-availability and storing that part of regular information, i.e. that part of the regular data and information derived from it, that is going to be used to recalculate the affected results; determining, after the receipt of the delayed data, on the basis of the stored regular information and the delayed data, a delayed, but more accurate indication of the quality of service by recalculating said results of the first process which have been affected by the data-source non-availability, in a second process.

According to another aspect, a computer system is provided arranged to determine QoS in an IT infrastructure on the basis of QoS related data received from data sources for these QoS related data. The data from the data sources regularly arrive in real-time, but data from one or more of the data sources may occasionally be delayed. The computer system is programmed to: calculate, on the basis of the regular data, a real-time indication of the quality of service in a first process, said indication possibly being inaccurate since delayed data is not included; calculate, after the receipt of delayed data, on the basis of regular information, which comprises at least one of regular data and information derived from it, and the delayed data, a delayed, but more accurate indication of the quality of service in a second concurrent process.

According to another aspect, a computer program product is provided. The computer program product which is either in the form of a machine-readable medium with program code stored on it, or in the form of a propagated signal comprising a representation of program code. The program code is arranged to carry out a method, when executed on a computer system, of determining quality of service (QoS) in an IT infrastructure on the basis of QoS related data received from data sources for these QoS related data, wherein the data from the data sources regularly arrive in real-time, but data from one or more of the data sources may occasionally be delayed. The method comprises: calculating, on the basis of the regular data, a real-time indication of the quality of service in a first process, said indication possibly being inaccurate since delayed data is not included; and calculating, after the receipt of delayed data, on the basis of regular information, which comprises at least one of regular data and information derived from it, and the delayed data, a delayed, but more accurate indication of the quality of service in a second concurrent process.

Other features are inherent in the methods and products disclosed or will become apparent to those skilled in the art from the following detailed description of embodiments and its accompanying drawings.

BRIEF DESCRIPTION OF THE DRAWINGS

Embodiments of the invention will now be described, by way of example, and with reference to the accompanying drawings, in which.

The drawings and the description of the drawings are of embodiments of the invention and not of the invention itself.

DESCRIPTION OF THE PREFERRED EMBODIMENTS

Figure 1:
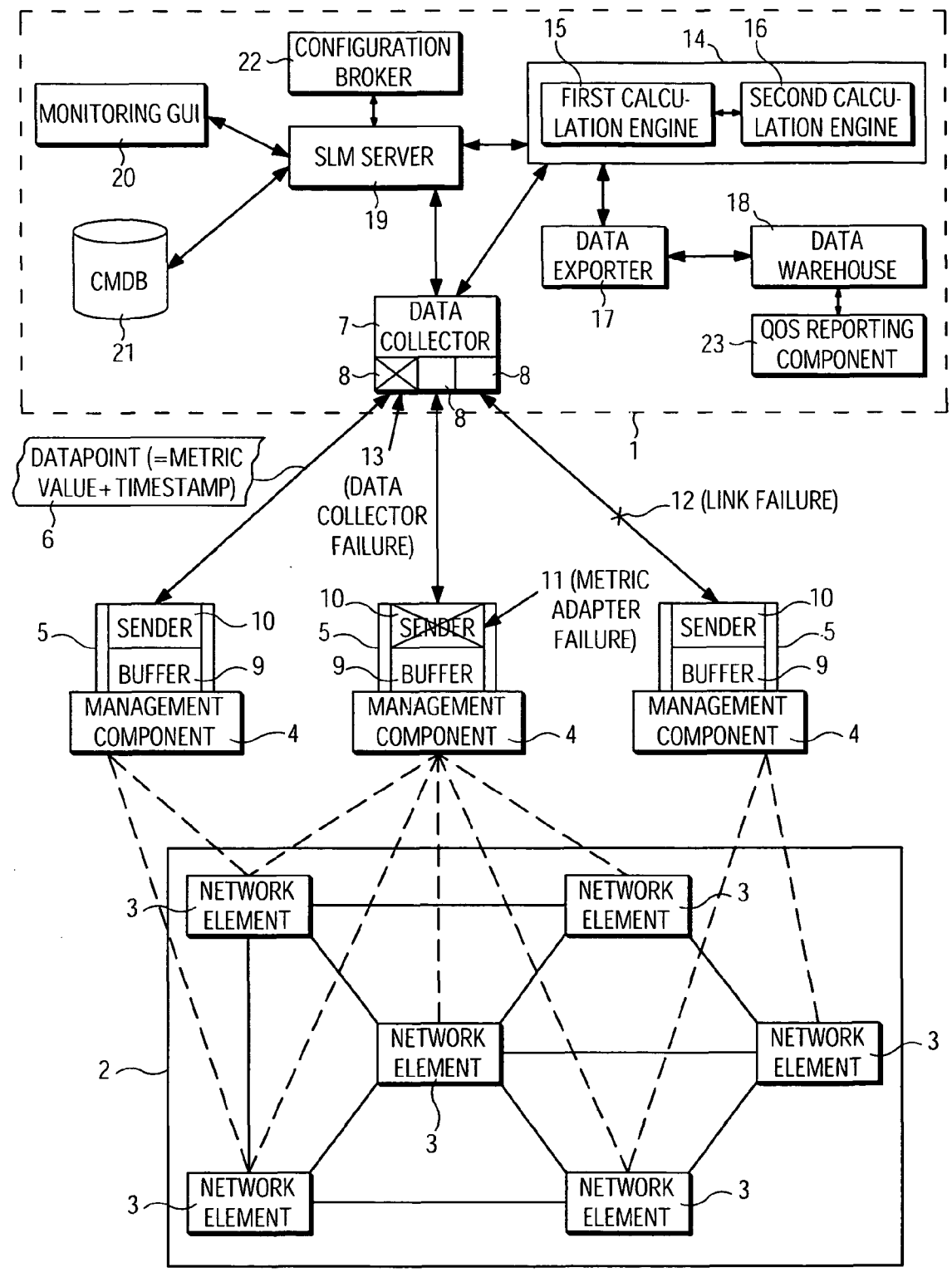
FIG. 1 is a high-level architecture diagram of an exemplary QoS management system and a managed IT infrastructure, according to embodiments of the invention.

FIG. 1 is a high-level architecture diagram of an exemplary QoS management system and a managed IT infrastructure. Before proceeding further with the detailed description of FIG. 1, however, a few items of the embodiments will be discussed.

The embodiments described pertain to the determination of the quality of service (QoS) in an IT infrastructure which may be a computer network or a telecommunication network, including applications and services based on it. As mentioned at the outset, an IT infrastructure typically includes not only physical devices such as cables, network interconnecting devices and hosts, but also "logical" items, such as applications, middleware and operating systems running on the interconnecting devices and hosts of the network. A service is typically a functionality relying on a combination of many such physical devices and logical items; examples are, as mentioned at the outset, transport services through a network, name services, e-mail services, web-request-response services, database services, and a wealth of specific application services tailored to a company's individual business needs. When such services are outsourced to service providers, an agreement is typically made between the service provider and the customer defining which level of service quality the service provider is obliged to deliver. Although QoS is often a perceived entity, it is measured quantitatively to enable the compliance with the commitments made in the SLA to be permanently tracked and, eventually, at the end of a compliance period, to be verified by both the service provider and the customer in an objective manner.

In some of the embodiments, determination of the QoS in a quantitative manner is based on a measurement of QoS-related entities reflecting the commitments made in the SLA. These entities are often called "metrics" (see Lee, pp. 315-319) or "metric entities", and measured instances of these entities are also called "metric values" or "metric data" hereinafter. Examples of measured metrics are availability, e.g. the availability of a network-interconnecting device or a host (the corresponding metric values may be logical values, such as "true" for "available" and "false" for "unavailable"); performance, for example of devices or the network transmission; latency, such as response time of a server or network delay; reliability, for example expressed by the number of failures; wherein all the latter metric values are typically numerical values (see Lee, pp. 44-46).

The QoS-related data, e.g. the metric values, are provided by suitable data sources. In some of the embodiments, the data sources are data interfaces of stand-alone IT management tools and/or IT management platforms.

Normally, the metric data are delivered by the data sources to a QoS management system in a real-time manner. "Real-time" does not mean that the metric data are delivered instantaneously upon the occurrence of an incident or a status which is to be reflected by metric data, but includes regularly-occurring delays. For example, such an incident or status change is typically not instantaneously observed, but only after an asynchronous message has been received (in the case of an asynchronous event notification) or a status inquiry has been sent out and a response has been received (in the case of synchronous status reporting) by a management tool concerned. In addition, the management tool then typically needs a certain processing time to prepare the metric data. Finally, there will typically be a certain transmission delay needed for the transmission of the metric data from the data source to the QoS management system over a network. The sum of these contributions is the regular delay of the real-time metric data; these data are therefore also called "regular data".

By contrast, metric data may be further delayed in an irregular manner. For example, the network connection between one or more of the data sources and the QoS management system may be inoperative for some time, and when the network connection becomes operative again, the metric data which have been produced in the meantime and buffered in the data source or sources concerned are subsequently transmitted to the QoS management system. Another cause of irregular delays may be that a data collector of the QoS management system is temporarily unable to receive metric data from one or more data sources, or that a management tool's data sender is temporarily inoperative. All three causes of delay shall be covered by the expressions "data-source unavailability" or "data-source failure" hereinafter. In all such cases, in some of the embodiments, the metric data generated during the failure are buffered at the management tools and are later forwarded to the QoS management system when the data source is available again, e.g. the network connection, the data collector or the data sender is operative again. To this end, in some of the embodiments, the communication between the data sources and the QoS management system is based on a secure-connection establishment for the data transmission between the data source and the QoS management system, and the data transmission is only considered successful when the data collector confirms the receipt of the data to the data sender; data which cannot be successfully transmitted are buffered, and are re-send later (the re-sending may, for example, be based on "trial and error", until the data-source failure is removed and successful delivery is possible). Such data are called "delayed data".

The QoS management system calculates an indication of the quality of service based on the metric data received from the data sources. Typically, an SLO defined in an SLA is based on QoS parameters which are a combination of measured metric values; often, the QoS parameters are cumulated over a compliance period. The SLO typically requires the cumulated QoS parameter to stay below a certain threshold.

As a simple example, an SLA could require the following SLO expression to be "true" (relating to a certain agreed compliance period e.g., a calendar month): (average_server_response_time <0.2 sec) AND (cumulated_server_unavailability <=0.02%) AND (cumulated_database_unavailability <=0.05%). The metric data used in this example may be delivered repeatedly (e.g. every five seconds) by three different data sources. For example, a first data source may deliver a database-response time (i.e. a numerical value) measured every five seconds, and two other data sources may deliver, every five seconds, a logical value indicating whether the server and the database in question are available in the present measurement interval (e.g. the present five-second interval) or not. An exemplary QoS management system then calculates, on the basis of these metric values, the average_database_response_time, averaged since the beginning of the compliance period, and the cumulated_server_unavailability and cumulated_database_unavailability, accumulated since the beginning of the compliance period. However, generally, the QoS parameters accumulated are not simply measured metric values, as in the example above, but are values calculated by logical and/or mathematical combinations of measured metric values, threshold values, etc. in each of the short time intervals, as will be described below.

In order to obtain a useful compliance prediction, in some embodiments the cumulated metric values are expressed as a percentage of the period of time elapsed since the beginning of the compliance period. For example, if the server is unavailable for three minutes on the first day of the compliance period, the cumulated_server_unavailability at the end of the first day would already be 0.021%, the above-mentioned SLO expression would therefore be "false" at that point of time, thereby indicating that the quality of service provided will not be compliant with the SLA if it continues in this manner. In some other embodiments the cumulated values are expressed as a percentage of the full length of the compliance period in order to provide an indication of how much unavailability can still be tolerated during the current compliance period and the service nevertheless remain within the SLA commitment. For example, if, on the $30^{th}$ day of a 31-day compliance period the cumulated_server_unavailability has already reached 0.02%, it is clear for the service provider that, in order to fulfill the QoS committed in the SLA for the present compliance period, no further server unavailability should be allowed to occur.

Using the example above, let us now assume that a data source delivering the measured server-response time data becomes unavailable, e.g. because the network connection between the data source becomes inoperative, so that the measured server-response time data are buffered at the data source, but are not transmitted to the QoS management system. As a consequence, temporarily, not all the metrics data needed to calculate an accurate real-time indication of the quality of service currently provided are available any more. If, as a result, the calculation were suspended until the interrupted network connection became operative again and the buffered server-response time data were available again, the service provider and the customer would be "blind" during the suspension period. For example, if during the suspension period the server or the database became unavailable, this would not be noticed at the QoS management system. On the other hand, if the calculation were not suspended, but continued, for example, by using the last value of the measured server-response time which was correctly transmitted in place of the undeliverable values actual measured, the result of the calculation might be inaccurate. For example, if the last measured server-response time was abnormally long, and this abnormal response-time value were then used during the suspension period in place of the actual server-response time, which might have, indeed, become normal again, this might result in an apparent non-compliance with the SLA, which would, in fact, not be correct.

In order to provide both a real time indication and an accurate indication of the quality of service, in some of the embodiments two processes are therefore carried out: in a first process, an indication of the quality of service is calculated on the basis of the regular data. This real-time indication is possibly inaccurate since delayed data is not included, but it is real-time. After the receipt of delayed data a delayed, but more accurate indication of the quality of service is calculated in a second concurrent process. This latter calculation is carried out on the basis of what is called "regular information" and the delayed data. The "regular information" may either be the regular data or information derived from them, such as intermediate results obtained from the regular data in the first process, or a combination of both. By providing these two calculation processes, two conflicting aims, immediateness and accuracy of the QoS determination, can be reached in a combined manner.

In order to be able to recalculate the QoS indication in the second process, the regular information to be used in the second process is stored at least until the delayed data are received, and is used as an input for the recalculation made in the second process, together with the delayed data. In some of the embodiments, all the regular data are normally stored irrespective of whether a data-source failure has happened, so that typically all the regular data are still available when delayed data are received. In some of the embodiments of this type, a complete recalculation is performed in the recalculation during the second process, using the stored regular data and the delayed data. In some of these embodiments, due to the fact that all the regular data are stored, it is not even necessary for the QoS management system to notice datasource failure at an early stage, i.e. at the beginning of the failure period; rather, it is sufficient for the data-source failure to be noticed retrospectively by the receipt of delayed data, after the data source has become available again. The second process is then started. As will be described below, some types of data source do not continually send data, but only rarely in the event of status changes. If no such status change happens during a data-source unavailability period, the datasource failure will not even be noticed, and the second process will not be started.

In other embodiments, the regular data are not always stored, but they are only stored when an occurrence datasource non-availability has been detected. In such embodiments, a mechanism is provided which enables a non-availability of a data source to be detected at an early stage, shortly after the data source has become unavailable, whereupon the second process is started. At that early stage, the second process mainly causes the regular data to be stored. Later, when the data source is available again and delayed data are received, the second process recalculates the quality of service using the stored regular data and the delayed data.

In a variant of the latter embodiments, upon detection that one or more of the data sources are not available, not all regular data are stored. Rather, the second process, which is started upon the detection, determines which results of the real-time calculation are affected by the detected data-source non-availability, and causes only that part of the regular data that is going to be used to recalculate the affected results to be stored.

In a further variant, not all the regular data are stored which are going to be used to recalculate the affected results, but intermediate results obtained from the regular data in the first calculation process are stored, if the intermediate results are sufficient to recalculate the affected results. Of course, in some cases a combination of regular data and intermediate results will be stored and in the recalculation, for example, if a result of the first process affected by the data-source unavailability is both based on certain regular data and on intermediate results calculated from them. The second process, which is started upon the detection that a data source has become unavailable, determines which regular data and intermediate results are to be stored, and causes them to be stored. Later, after the receipt of the delayed data, it determines a delayed, but more accurate, indication of the quality of service on the basis of the stored regular information (i.e. the stored regular data and intermediate results) and the delayed data, by recalculating the results of the real-time calculation of the first process which have been affected by the data-source non-availability. In these variants, the amount of data to be stored is smaller, and in the last variant fewer calculations are to be performed in the second process than in the other embodiments mentioned.

As mentioned above, in some of the embodiments, the QoS parameter values are repeatedly calculated for short time-intervals; since the calculation takes place once per time-interval, the time-intervals form "calculation cycles". The QoS parameter values calculated in this manner are, in some embodiments, combined over time, for example, cumulated over the current compliance period. In order to assign the metric data to the calculation cycles to which they belong, in some of the embodiments the metric data are labeled with timestamps by the data sources (one timestamp for each value), wherein a timestamp indicates the point of time when the data was generated. An item of metric data and its timestamp are together also called "datapoint". The timestamps enable the metric data to be put in the correct order, and metric data from the different data sources to be combined in a correct timely relationship based on their timestamps. Generally the input to a calculation carried out in a particular calculation cycle only includes those metric data which belong/correspond to this particular/specific calculation cycle. In some embodiments, this is only adhered to in the second calculation process, whereas in the first calculation process metric data belonging to other calculation cycles than the currently considered cycle may be used, due to the first process' real-time character. In other embodiments, however, even in the first calculation process only metric data belonging to the current calculation cycle are used and combined for this cycle.

It is not required, and normally not even the case, that in every calculation cycle, new datapoints are received from the data sources for all the metric entities which are the input entities of the calculation carried out; using the example above, it is not required that a new datapoint for the metric entities "server response time", "server availability" and "database availability" is received in every calculation cycle. Rather, it may happen that in many calculation cycles, new datapoints for some of, or even all, the metric entities are missing. In some of the embodiments, in the event of a missing new datapoint, it is simply assumed that the value of a metric entity which was received last remains valid until a new datapoint for this entity is received. Using the example above, let us assume that datapoints are received as follows:

|  | calculation cycle | | | | | | | |
| --- | --- | --- | --- | --- | --- | --- | --- | --- |
|  | 1 | 2 | 3 | 4 | 5 | 6 | 7 | 8 |
| server response time [sec] | 0.1 | — | 0.15 | — | — | — | 0.1 | — |
| server availability | yes | no | — | — | yes | — | — | — |
| database availability | yes | — | — | — | — | — | — | — |

Then, in the embodiments mentioned, the following metric values are used in the calculation cycles:

|  | calculation cycle | | | | | | | |
| --- | --- | --- | --- | --- | --- | --- | --- | --- |
|  | 1 | 2 | 3 | 4 | 5 | 6 | 7 | 8 |
| server response time [sec] | 0.1 | 0.1 | 0.15 | 0.15 | 0.15 | 0.15 | 0.1 | 0.1 |

|  | calculation cycle | | | | | | | |
| --- | --- | --- | --- | --- | --- | --- | --- | --- |
|  | 1 | 2 | 3 | 4 | 5 | 6 | 7 | 8 |
| server availability | yes | no | no | no | yes | yes | yes | yes |
| database availability | yes | yes | yes | yes | yes | yes | yes | yes |

There are different causes for the absence of new datapoints: although, in principle, it is possible that the data sources regularly deliver one datapoint per calculation cycle for each input entity, some datapoints may be missing in the real-time calculation process, due to data-source failures. However, in other embodiments, some, or all of the data sources deliver their data with a smaller frequency than the data cycle frequency. In still further embodiments, all, or some, of the data sources deliver their data in an asynchronous manner; for example, they only send a data item when an "event" (e.g. a status change) occurs. In those cases, new datapoints will not even be available for all input entities in every calculation cycle of this second calculation process; rather, even without any data-source failure, the new datapoints will arrive with a lower frequency than the calculation-cycle frequency, or even in a non-periodic and unforeseeable manner, in the case of asynchronous events. In some of the embodiments, in such cases the previously received value is still considered valid, and is used in all the subsequent calculation cycles, until a new value is received.

Conversely, it is also possible that two datapoints of the same entity fall within one calculation cycle. For example, a network element might become unavailable for a very short time, so that two events take place immediately one after the other, namely "network element is unavailable" and "network element is available". In some embodiments, two datapoints representing these events will be produced, which may fall within one and the same calculation cycle. Such conflicts are resolved with suitable collision rules. For example, in some of these embodiments, the "most serious" value of such conflicting datapoints is used as the (only) input value for the calculation in this calculation cycle (e.g. the value "unavailable"), whereas the value of the last one of conflicting datapoints is the one which is assumed in the subsequent calculation cycles as the valid value, until a new value is received. In other embodiments, only the value of the last one of conflicting datapoints is used, and other conflicting datapoints are ignored. In the latter embodiments, the handling of conflicting datapoints can already be made at the level of the data sources. For example, in some embodiments the data sources only forward the last one of conflicting events and discard the others. Thereby it is guaranteed that no conflicting datapoints are transmitted to the QoS management system. In some of the embodiments in which the conflict resolution is performed at the level of the data sources (or in which such conflicts do not occur, for example, when the calculation intervals are shorter than the minimum time interval between subsequent events), the time resolution of the time-stamping is equal to the calculation-cycle period. In other words, a timestamp only indicates to which calculation cycle a datapoint belongs, but does not indicate to what point within a calculation-cycle interval a datapoint belongs. For example, in some of the embodiments an incremental counter is used to produce the timestamps, wherein one incremental step corresponds to one calculation cycle. For example, the timestamps for subsequent calculation cycles may then read: 0001, 0002, 0003, etc.

As mentioned above, in some of the embodiments regular information (i.e. regular data and/or intermediate results obtained from them in the first process) is only stored upon detection that one or more of the data sources are unavailable because only the regular information that belongs to calculation cycles that pertain to times after a data source became unavailable will be used in the real calculation process. In such embodiments a discrepancy may occur, due to a small time gap between the time when the data source actually became unavailable and the time when this was detected, if there is a datapoint in this time gap. Since such a datapoint would neither be used in the first process (since it is not regularly transmitted to the QoS management system but delayed) nor used in the second process (since it belongs to a calculation cycle which is not recalculated since it lies before the detection of the unavailability), it would be lost completely. To prevent this happening, in some embodiments the timestamp of such a datapoint (transmitted by the data source as a delayed datapoint as soon as the source becomes available again but in fact belonging to the calculation interval prior to unavailability) is incremented artificially so that the datapoint appears to belong to a calculation cycle (e.g. the first cycle) performed after unavailability was detected. In this way the datapoint is used in the second process as if it had been generated after unavailability had been detected.

The manner in which the different metric entities are combined in the calculation process performed in each calculation cycle can be represented by a calculation graph. The metric entities themselves and thresholds, etc. with which they are combined, as well calculation results and the logical or mathematical operations to obtain the results, form the nodes of the calculation graph. For example, if in a calculation process it had to be ascertained whether a certain metric value is above a certain threshold, the corresponding calculation graph would have three nodes: a first node would represent the metric entity, a second node the threshold value, and a third node the logical operation ">" and the result of the comparison; the result is here a Boolean value, which, for example, may be a QoS parameter representing an SLO, e.g. the availability of a server. The nodes are connected by directed edges, wherein the direction indicates how the calculation proceeds. For example, if one illustrates the directed edges by arrows, there will be an arrow pointing from the first to the third node and another arrow from the second to the third node. Generally, the calculation graphs are more complex and have therefore intermediate nodes; such intermediate nodes represent intermediate results which are an input for subsequent calculations, represented by nodes above.

As mentioned above, in some of the embodiments, all datapoints or a calculation cycle, which form the input to the calculation graph are stored, either unconditionally for all calculation cycles, or for calculation cycles following the detection of a data-source unavailability. In those embodiments, the calculation graph used in the second process may be the same as in the first process, i.e. it may be the complete calculation graph used in the first process. In other words, the types of calculations carried out in the first and second processes are the same, and the calculations in the two processes only differ in that the data input into the calculations may not be the same source (in the first calculation process, the delayed data are missing, and only the regular data are input, whereas in the second calculation process both the regular and delayed data are input).

In certain cases, in which the calculation graph is branched in the upward direction, the absence the values of a metric entity due to a data-source failure may only affect one branch of the calculation graph, but not the other(s). In some of the embodiments, in such cases the second process is not based on the complete calculation graph used in the first process, but only on that part of it which is affected by the absence of the metric values of this entity. This partial graph is, for example, derived by the following algorithm: all directed paths are propagated upwardly from the node of the missing entity to the nodes of the uppermost level which can be reached by following the direction of the arrows indicating the direction of calculation when evaluating the graph. These nodes are marked. Then, departing from the marked nodes, the graph is propagated downwards (opposite the directions indicated by the arrows) whereby all nodes reached during this second propagation process are also marked. The marked nodes, and the directed links between them, form the partial graph used in the second calculation process. In some of the embodiments the partial calculation graph for the second process is determined at an early stage, upon the detection of a data delay, and if it is determined that the partial calculation graph to be used in the second calculation process only requires the values of some of, but not all metric entities, only the values of those metric entities required are stored.

In still other embodiments, as explained above, not all the values of the metric entities needed to recalculate a (complete or partial) calculation graph are stored, but rather the intermediate results of the first calculation process are stored, insofar as they are not affected by the data-source unavailability. Other intermediate results not affected by the data delay are not stored. However, it will not always be sufficient to store only intermediate results, but no metric values. For example, if an intermediate result which not (only) depends on lower intermediate results in the calculation graph's hierarchy but depends directly on metric values, is affected by a data-source failure, these metric values are also stored. As mentioned above, intermediate results are represented by nodes in the calculation graph. Therefore, in embodiments, in which intermediate results are stored and re-used in the recalculation process, the calculation graph used in the second process is a partial calculation graph formed by the nodes representing the stored intermediate results and the stored metric values, and all the nodes and links of the first calculation graph which are above these "start nodes". This partial calculation graph is determined at an early stage, upon detection of a data-source failure, in order to define which intermediate results and metric values are to be buffered.

The calculation graph need not always remain the same, but may be changed from time to time (apart from the fact, of course, that the second process, in some embodiments, may be based on a partial graph of the first process graph). For example, the commitments made in an SLA may differentiate between day time and night, or may depend on certain events (e.g. availability requirements may be stricter in emergency cases). In some of the embodiments, the use of a modified calculation graph is triggered by so-called schedule events or configuration events which indicate that a schedule or a configuration change requires a modified calculation graph to be used. The modified calculation graph may be structurally different from the original one, and/or may have different threshold values. Since the first calculation process works in a real-time manner, but the second process performs "historical" work, it may happen that the second process calculates using a different calculation graph to that of the first process. If, for example, a configuration change has occurred at some point of time requiring calculation graph B now to be used instead of former calculation graph A, then, for some time, the first process will calculate the calculation graph B for the processing of the real-time data, whereas the second process will still base its recalculation on the previous calculation graph A.

As soon as the calculation carried out in the second process has caught up with the first process, the possibly inaccurate QoS indication calculated by the first process during a preceding data-source failure is replaced by the more accurate QoS indication of the second process, in which the data delayed due to the data-source failure have been taken into account, and the two processes are merged into one process. In some of the embodiments, this is achieved by synchronizing the first process with the second process, and subsequently suspending the second process. For example, the second process continuously sends synchronization requests containing the timestamp of the calculation cycle currently performed by it to the first process. The first process compares the received timestamp with the timestamp of its own currently performed calculation cycle. If the timestamps are equal, the request is accepted and the synchronization process is triggered (should the timestamp of the first process be newer, the request is also accepted, but the second process is stopped for a while, and the synchronization process is only triggered when both timestamps are equal). In the synchronization process, the values of the entities of the current calculation cycle in the calculation graph, and all accumulated values, etc. of the second process are copied to the corresponding entities of the first process. However, the metric values and intermediate results stored by the second process are deleted, and the second process is then suspended. Alternatively, in other embodiments, the second process replaces the first process when the second process has caught up with the first process.

As mentioned above, in some of the embodiments all datapoints are stored for a sufficient time period, irrespective of whether a data source has actually become unavailable or not. In such embodiments, there is no need for the QoS management system to become aware of a data-source unavailability in a real-time manner; rather, this awareness may also be delayed, as the delayed data. For example, it would be sufficient for the QoS management system only to be made aware of a data-source failure retrospectively by the delayed receipt of the data, after the data source has become available again.

In other embodiments, however, datapoints, and/or intermediate results calculated in the first process, are only stored upon detection of a data-source unavailability. In these embodiments, a data-source failure is detected by the QoS management system, shortly after it actually occurred. In other words, although the QoS management system does not include delayed data in its real-time calculation process, it nevertheless becomes aware of data-source unavailabilities in a real-time, or near real-time manner.

In some of the embodiments with periodically-sending data sources, this detection is based on the data-source periodicity by an inference mechanism. For example, if suddenly no data are received any more from a normally periodic data source, the QoS system infers that the data source has become unavailable.

In other embodiments, however, the period of the data sources may be too long to be used for a failure inference, or the data sources may send their data in an asynchronous manner, i.e. without request from the QoS management system and without periodicity. For example, an asynchronous data source may only send a data when a network element that it is monitoring changes its state from "available" to "unavailable", or vice versa; if no such status change occurs in the monitored network element, such a data source will remain silent for a long period. Consequently, the absence of data from an asynchronous data source does not indicate that the data source is unavailable.

In order to ascertain the availability of the data sources, in some of the embodiments the data sources are polled from time to time by the QoS management system. In some embodiments the polling is periodically made, at short intervals (e.g. every 10 seconds), and is therefore also called "heartbeat polling". In some of the embodiments, "polling" means sending a special inquiry whether the data source is available. A polled data source returns a response indicating whether the data source is available or not. In the case of a failure of the network between data source and QoS management system, the polling communication may also fail; the QoS management system then infers a data-source unavailability from the absence of a polling response. Polling requests, and the responses returned by the data sources are typically smaller and can be processed faster than more complex requests, such as requests to send data or the like. Nevertheless, in some of the embodiments the availability of data sources is ascertained by sending to them requests to send data, rather than specialized polling requests. If a data source does not respond to a polling request, or indicates in response to a polling request that it is unavailable, the second process is triggered. As explained above, at this early stage the second process does not yet perform any recalculation, since the data from the unavailable data source are not yet available, but causes the undelayed datapoints and/or intermediate results of the first calculation process to be stored, at least insofar as they affect the result of the first calculation process. The recalculation, which is part of the second process, commences later, upon receipt of the delayed data.

As is clear in the context of asynchronous data sources, a failure of such a data source only implies a potential data delay, but does not necessarily mean that a data is actually delayed. Since an asynchronous data source may only send a data in the case of an "event" (e.g. a status change), no data will be sent, and consequently no data will actually be delayed, if no status change occurs during the data source's unavailability period. Consequently, in such cases, the real-time calculation will actually be correct, in spite of the data source's unavailability. However, the fact that there was no event data indicating a status change during the data source's unavailability period is only going to be known when the data source is available again, because this can be inferred from the fact that the data source, after having become available again, sends no delayed datapoint; consequently, although the results of the first and second processes are equal, certainty that the result of the first calculation process is correct is only provided by the second process.

When a previously unavailable data source becomes available again, it starts to forward the datapoints buffered during its unavailability period, if any, to the QoS management system. However, in the case of an asynchronous data source, the QoS management system, per se, does not know the number of delayed datapoints to be received. Therefore, in some of the embodiments the data source sends, either automatically or on request from the QoS management system an indication of the number of delayed datapoints or, alternatively, an end-of-transmission indication that all delayed datapoints have been transmitted. If no datapoint was delayed, the number indication will be "zero", or the end-of-transmission indication will be sent without any previously transmitted datapoint. Such an indication tells the QoS management system that no event happened during the unavailability period. Since this information is delayed, it shall also be covered by the expression "delayed data" used herein, and the receipt of this information shall be covered by the expression "receipt of delayed data".

Finally, it should be mentioned that the absence of events during an availability period might also be inferred from the fact that no data are received when the data source is available again, without any number indication or end-of-transmission indication. Due to its information content, which is received delayed, such a "no-receipt" of datapoints may therefore be considered as a "receipt of delayed data", in the language used herein.

Some of the embodiments of the computer program product with program code for performing the described methods include any machine-readable medium that is capable of storing or encoding the program code. The term "machine-readable medium" shall accordingly be taken to include, for example, solid state memories and, removable and non removable, optical and magnetic storage media. In other embodiments, the computer program product is in the form of a propagated signal comprising a representation of the program code, which is increasingly becoming the usual way to distribute software. The signal is, for example, carried on an electromagnetic wave, e.g. transmitted over a copper cable or through the air, or a light wave transmitted through an optical fiber. The program code may be machine code or another code which can be converted into machine code, such as source code in a multi-purpose programming language, e.g. C, C++, Java, C#, etc. The embodiments of a computer system may be commercially available general-purpose computers programmed with the program code.

FIG. 1: QoS-Management-System Architecture:

Returning now to FIG. 1, which illustrates the architecture of a QoS management system 1 and a managed IT network 2. The managed IT network 2 includes several connected network elements 3, such as hosts (servers, workstations, storage devices, output devices etc.) and network interconnecting devices (switches, routers, etc.). The network 2 is managed by network management components 4 which are components of an integrated management platform, such as HP OpenView, and/or stand-alone software tools. The management tools 4 are fault- and performance-management tools, e.g. they are arranged to detect unavailability, faults, impending faults, malfunctioning, the performance and performance problems, latency, etc. of the network elements 2 and applications and services provided by the network 2. The management components 4 either obtain information from the network elements 3 in an asynchronous manner, i.e. in the form of unsolicited notifications (e.g. called "traps" in SNMP) sent from the network elements 3, as would happen for example in the event of a status change, or in a synchronous manner, e.g. periodically, or as a response from a network element 3 to a corresponding request from a management component 4. The management components 4 procure the information either in an elementary manner (such as by the receipt of a notification that a failure has occurred in a certain network element 3) or in a complex manner (such as in an HTTP server response-time determination in which a management component 4 sends an HTTP test request to a network element 3, which is an HTTP server in this example, and measures the time elapsing until an HTTP response from the HTTP server is received).

Since the management tools 4 monitor the functioning and performance of the network 2 and its applications and services, they are also able to provide the data, the metric values, used by the QoS management system 1 to determine the QoS objectively and ascertain whether the QoS achieved is compliant with an SLA. The actual data sources are data interfaces, called "metric adapters" 5, to the management tools 4. The metric values are time-stamped, either by the management tool 4 or the metric adapter 5, to indicate the point of time at which the data were generated. As mentioned above the time-stamped metric values are "datapoints", illustrated at 6 in FIG. 1. The metric adapters 5 collect the datapoints 6 from their management tool 4 and transmit them to a data collector 7 of the QoS management system 1 which has several data receivers 8. The metric adapters 5 and the data collector 7 are linked by a network which may be part of the network 2, or of another local-area or wide-area network. The transmission of the datapoints 7 is performed with a connection-based store-and-forward mechanism, for example using the HTTP protocol. The connection-based store-and-forward mechanism guarantees the delivery of data (sent in the form of data packages); consequently it is ensured that the data from a metric adapter 5 are not lost somewhere, but are received at the data collector 7. If a datapoint 6 cannot be sent immediately, for example due to a network failure, it is buffered locally in the originating metric adapter 5 until successful delivery is possible. For that purpose, the metric adapters 5 have a buffer 9 for storing currently undeliverable datapoints 6, and a data sender 10. Owing to the connection-based store-and-forward mechanism, datapoints 6 may be delayed, but not lost.

A delay in the transmission of a datapoint 6 from a management tool 4 to the QoS management system 1 may arise for several reasons. For example, a failure of a data sender 10 within a metric adapter 5, called metric adapter failure 11, a failure in the network link between a metric adapter 5 and the data collector 7, called link failure 12, or a failure of a data receiver within the data collector 7, called data collector failure 13, may occur. All datapoints 6 generated during such a failure period are stored in the buffer 9 of the metric adapter 5 concerned, and are transmitted to the data collector 7 when the data sender 10, the network link, or the data receiver 8 is operative again. In other embodiments, a failure may also occur in a management component 4, as a result of which datapoints 6 are buffered "deeper" in the management component 4, and are only provided to the metric adapter 5 later, which forwards them belatedly to the data collector 7.

The data collector 7 receives the undelayed and delayed datapoints 6, each containing a metric value and a timestamp, from the metric adapters 5. It collects the datapoints 6 from all metric adapters 5, and forwards them to a calculation system 14. In the calculation system 14, normally—if no delay in the transmission of datapoints has occurred—a first calculation engine 15 is active. If delay has occurred and a recalculation due to delayed data is performed, a second calculation engine 16 is also active. In some of the embodiments, the calculation engines 15, 16 are actually logical objects, namely processes carried out by one or more processors of the calculation system 14. In other embodiments the first and second calculation engines 15, 16 are physically distinct entities, for example a dedicated processor suitably programmed is the first calculation engine 15 and another processor, suitably programmed too, is the second calculation engine 16. In some of the embodiments in which the calculation engines are processes which may be carried out by the same processor or processor system, the second calculation engine 16 is not always present; rather, the process representing it is only initiated when a data delay is detected, and terminated when the QoS recalculation has been finished, as will be explained below.

The calculation system 14 calculates QoS parameters in calculation cycles, based on the datapoints 6 from the data collector 7. The first calculation engine 15 calculates the QoS parameters in a real-time manner, i.e. without including delayed datapoints 6 in the calculation cycles. Consequently, the QoS parameters obtained by the first calculation engine 15 may be inaccurate. By contrast, the second calculation engine 16 includes the delayed datapoints 7 in the calculation cycles and, therefore, provides more accurate, but delayed QoS parameters. The calculation engines 15, 16 also include result accumulators which accumulate the QoS parameters obtained in the calculation cycles over time; the accumulated QoS parameters provide an objective indication of whether the QoS achieved within the accumulation period is compliant with the SLA (if the accumulation period is a past compliance period) or will be compliant with it (if the accumulation period is a first part of a current compliance period).

Calculated QoS parameters and accumulated QoS parameters and, if required, datapoints 6 from the data collector 7 and intermediate calculation results may not only be exchanged between the first and the second calculation engine 15, 16, but are also stored, via a data exporter 17, in a data warehouse 18. The accumulated QoS parameters are also transferred and stored in an service level management (SLM) server 19. A monitoring graphical user interface (GUI) 20 displays the accumulated QoS parameters in a real-time manner (corrected from time to time by the more accurate recalculation results) to enable a network operator to assess the current QoS compliance status and to intervene immediately when a QoS non-compliance is imminent. The SLM server 19 is also connected to a configuration management database (CMDB) 21 and a configuration broker 22. The CMDB 21 stores data representing calculation graphs according to which the calculation system 14 calculates and accumulates the QoS parameters, and data representing the relevant service level agreement (thresholds, configuration data, etc.). The configuration broker 22 manages configuration changes and defines a currently valid configuration. Configuration changes are all changes that influence the calculation graph which defines what is to be calculated by the calculation system 14; such configuration changes may be changes in the network 2, the management tools 4, and/or the currently valid QoS definition (for example, a service-level agreement may define stricter availability requirements during normal working hours than during other time periods; correspondingly, the calculation graph will change at the beginning and the end of working hours).

Besides its capability of QoS real-time monitoring, the QoS management system 1 is also able to provide definite QoS compliance reports, for example reports indicating at the end of a compliance period (e.g. at the end of every month) whether the QoS during the compliance period was compliant with the requirements set out in SLA. A QoS reporting component 23 is arranged to automatically generate such reports, using the accumulated QoS parameters stored in the data warehouse 18. Since the QoS reporting component 23 is not subjected to real-time requirements, it typically only uses the accurate accumulated QoS parameters, i.e. the ones which were corrected by the second engine's recalculation.

Figure 2A:
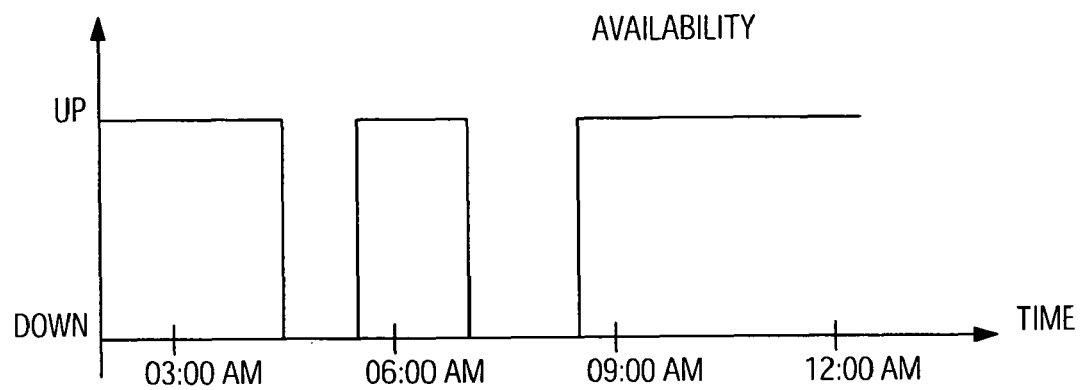
FIGS. 2a and 2b illustrate an exemplary QoS monitoring output in an embodiment of the invention.

FIG. 2: Exemplary QoS Monitoring:

An exemplary output in the monitoring GUI 209 of the QoS management system in FIG. 1 is depicted in FIG. 2, which shows a calculated QoS parameter versus time. In the example shown, it is assumed the QoS parameter is the availability of a service, which, for example, may be a logical AND of the availability of several individual network elements 3. The horizontal axis indicates time, whereas the vertical axis specifies whether the service is "up" or "down". In the example of FIG. 2a, an unavailability of the service is detected from 4:30 a.m. to 5:30 a.m. and from 7:00 a.m. to 8:30 a.m. and displayed in the monitoring GUI 20 in real-time. The availability will be determined for short time-intervals in the order ranging from seconds to a minute (e.g. every 30 seconds), but does not need to be displayed in the GUI 19 with such a fine resolution. Two types of unavailability are discussed herein, which should be distinguished: (i) the unavailability of a service or network element which is relevant to the QoS determination and should therefore be known to the QoS management system; (ii) the unavailability of data source for metric values (which may represent an unavailability of the type (i)), as a result of which these metric values are temporarily not transmitted to QoS management system so that the QoS management system may temporarily be unaware of the information represented by these metric values. For example, if a coincidence of the unavailabilities of type (i) and type (ii) occurs, the QoS system may be unaware that the service or network element is unavailable.

Figure 2B:
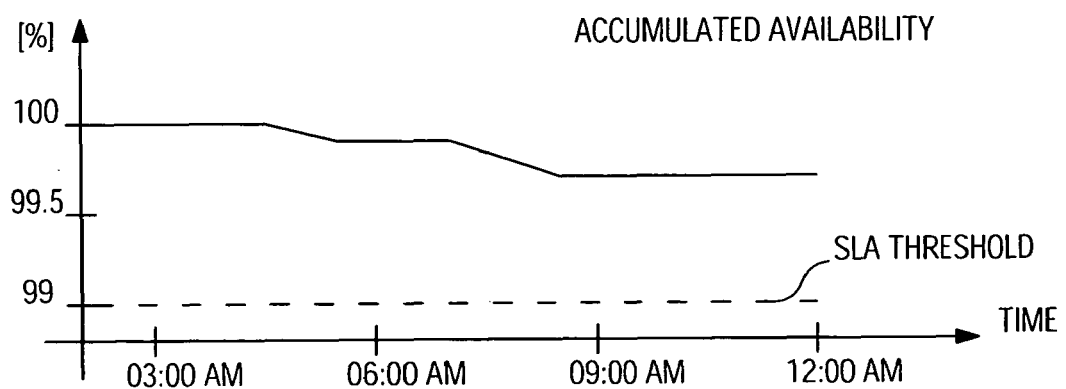

FIG. 2b shows the accumulated availability of the service in the example of FIG. 2a. The vertical axis indicates here the accumulated availability of the service expressed as a percentage of a total compliance period, e.g. one month. More specifically, the accumulated availability at a point of time t indicates 100%-(unavailability_from_start_to_t/total_compliance_period). Clearly, the accumulated availability decreases monotonic and a comparison with an SLA threshold (an SLO) may indicate at the end of the period considered whether the SLA has been complied with or not. In the example of FIG. 2b it is assumed that an accumulated availability of a least 99% is required at the end of the period. The accumulated-availability curve shown starts at 100% (assuming that no unavailability has occurred before) and decreases during each of the unavailability periods of FIG. 2a. Such a curve provides the operator with a real-time view of how the system approaches the SLA threshold. In the example shown, the curve has not yet under-run the threshold.

Figure 3:
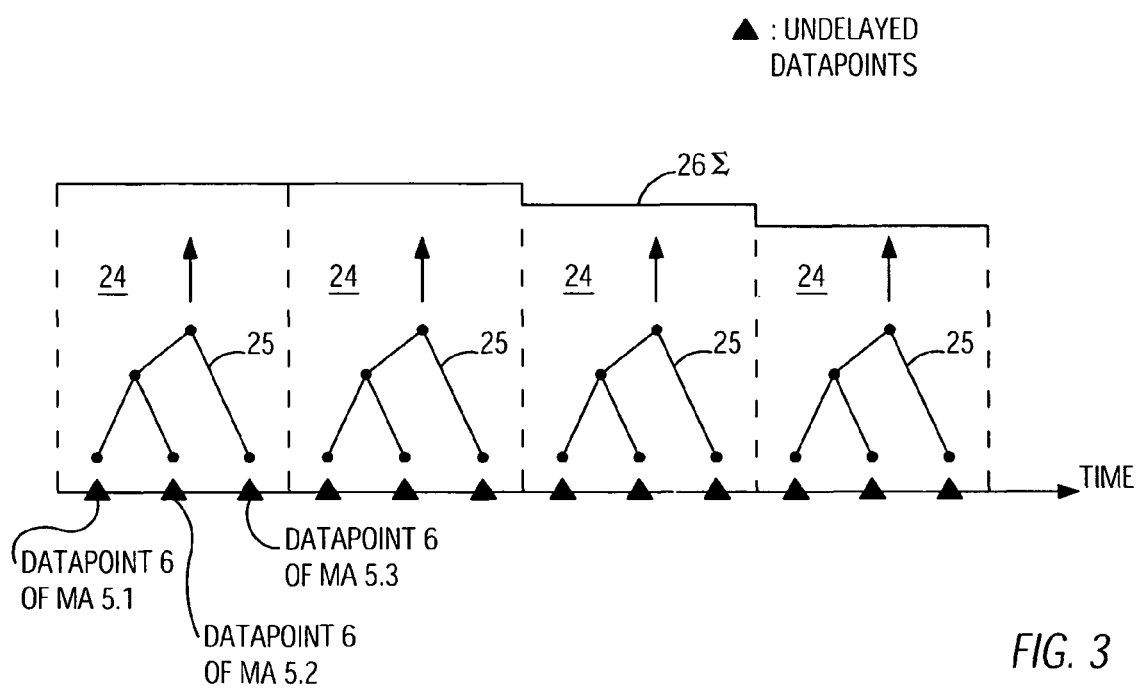
FIG. 3 illustrates an exemplary QoS determination process, without any data-source unavailability.

FIG. 3: QoS Determination Process Without Data-Source Unavailability:

FIG. 3 illustrates the calculation of QoS parameter values, such as the availability of FIG. 2 in a case in which all datapoints 6 are transmitted in real-time to the QoS management system 1, i.e. without any irregular delay, i.e. in the absence of a metric adapter failure 11, a link failure 12, a data collection failure 13, or the like. Accordingly, no delayed datapoints 6 need to be taken into account, all the calculations are made by the first calculation engine 15, and the second calculation engine 16 is not initiated (or it is idle), assuming, of course, that no delayed datapoints from previous delays are still being processed. The time axis is subdivided into calculation cycles 24. Each calculation cycle 24 uses one or more metric values (in FIG. 3 three values) as input, each of which is indicated by a triangle on the time axis. The calculation graphs 25 are only shown in FIG. 3 in an illustrative manner above the time axis; this does not imply that the calculation graphs 25 are evaluated from left to right, or that the evaluation starts when the first datapoint is received. Rather, a calculation graph 25 will typically be evaluated from bottom to top. Furthermore, a calculation cycle 25 has normally a reception time limit by the end of which all datapoints to be used in the cycle 25 have to be received, and a calculation period following the reception time limit in which the actual calculation is performed.

FIG. 3 shows an example of a "clocked system" in which all the data sources, i.e. the metric adapters (MAs) 5.1, 5.2 and 5.3 in FIG. 3, produce datapoints 6 in a periodic manner; in the example of FIG. 3 each data source produces one datapoint 6 for each calculation cycle 24. As a consequence, in the absence of data delays, a complete set of fresh metric values for all the input entities of the calculation graph 25 is available for all the calculation cycles 24. Generally a metric adapter 5 may provide more or less than one metric value in a calculation cycle 24. For example, in some embodiments, some, or all, of the metric adapters 5 send datapoints 6 in an asynchronous manner; for example, they only send a datapoint 6 if a status change has occurred (see e.g. FIG. 6). As explained above, if in a calculation cycle 24 no fresh metric value is present, although a value is to be used in the calculation, in some embodiments the metric value indicated by the last corresponding datapoint 6 received is considered valid and is used in the calculation cycles 24, until a new corresponding datapoint is received. The metric values of the datapoints 6 are processed, in each calculation cycle 24, according to a calculation graph 25. A calculation graph 25 is a reflection of the SLO in the SLA (more precisely: of that part of the SLO which refers to individual calculation cycles) and defines how the metric values measured are to be combined to generate a QoS parameter or several QoS parameters of different types for each calculation cycle. On top of that, an accumulation function 26 accumulates the QoS parameters calculated in the individual calculation cycles 24 and thereby generates an accumulated QoS parameter, for example an accumulated availability indication, as depicted in FIG. 2b.

Figure 4:
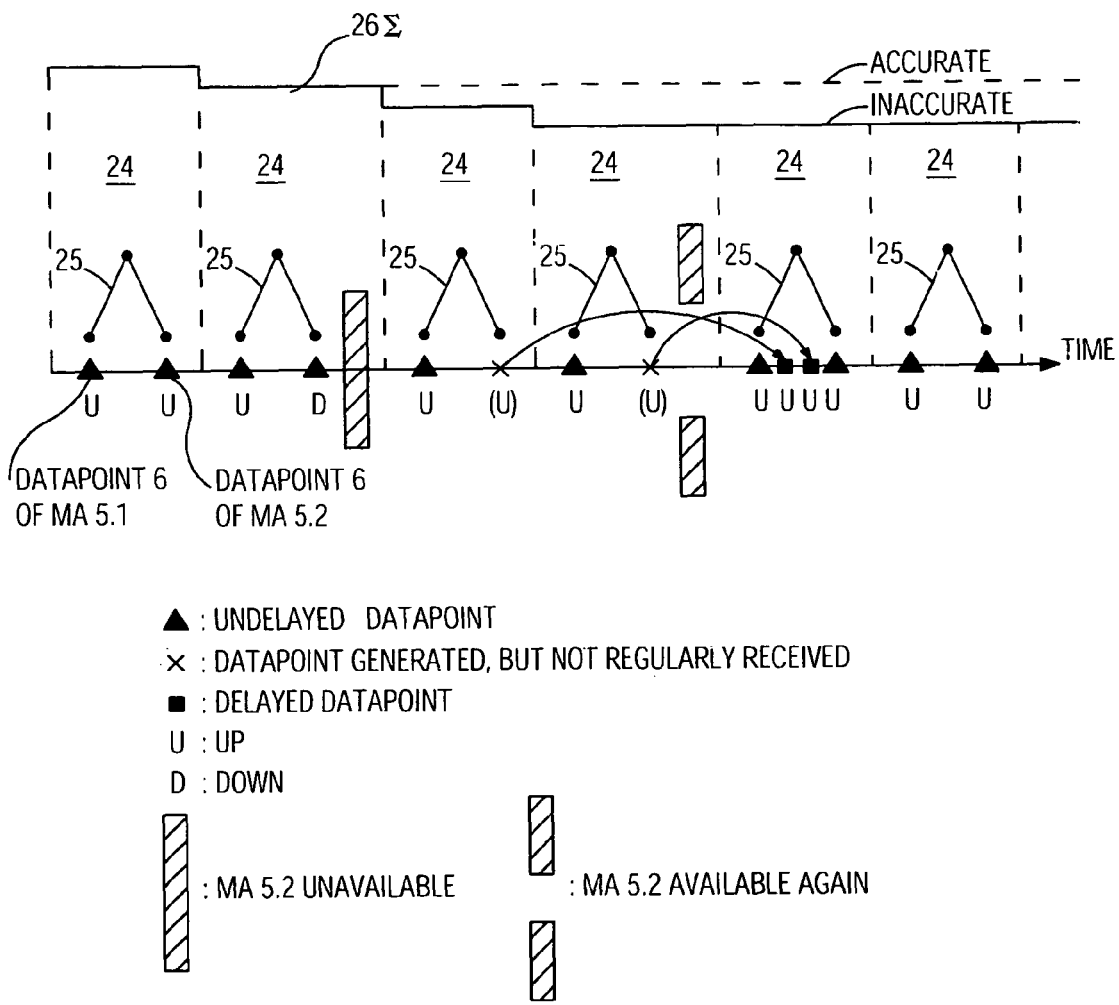
FIG. 4 illustrates a QoS determination process similar to FIG. 3, with data-source unavailability, but without a recalculation process.

FIG. 4: QoS Determination Process with Data-Source Unavailability, But without a Recalculation Process:

FIG. 4 illustrates possible consequences of a data-source unavailability, if no recalculation is carried out. In this example, only two metric values are input in each calculation cycle, and the calculation graph 25 consequently combines two metric values (rather than three, as in FIG. 3). For example, the two metric values represent the availability of two network elements 3 (FIG. 1) by values U (for "up") or D (for "down"), and the calculation graph 25 combines them by a logical AND, so that the resulting QoS parameter indicates the combined availability. Datapoints 6 which arrive in real-time are indicated by triangles, and datapoints 6 which are delayed (for example, due to a failure 11, 12 or 13) are indicated by "X", where they would have arrived regularly, and by small squares where they actually arrived after the delay. In each of the calculation cycles 24, one datapoint 6 from each of the two metric adapters 5.1, 5.2 is expected to arrive. In the example shown, the datapoints 6 from the first metric adapter 5.1 are never delayed, and always have the value U ("up"). In the first calculation cycle 24, the metric value sent by the second metric adapter 5.2 indicates that the network element 3 is up, but in the second calculation cycle 24, the second metric adapter 5.2 sends an indication that it is down (indicated by "D") since in the meantime the network element 3 has become unavailable. It is assumed now that shortly afterwards a metric adapter failure 11, a link failure 12 or a data collector failure 13 occurs such that the datapoints 6 from the second metric adapter 5.2 are not received anymore in real-time by the data collector 7. Two cycles 24 later, this failure 11, 12, 13 is removed again. Even though the irregularly transmitted datapoints 6 from the third and fourth cycles 24 are not lost, but received after the delay in the fifth cycle 24, they are not considered anymore since their timestamps indicate that the corresponding metric value was generated for previous calculation cycles 24. In the cycles 24 with a missing metric value, it will be assumed by a typical calculation system that nothing has changed; i.e. it will be assumed that the metric value from the metric adapter 5.2 was "D" for both the third and fourth cycles 24, since it was "D" in the second cycle 24. However, let us now suppose that the network element 3 had already become available again in the third cycle 24; then, the assumed values "D" and "D" to be used by the calculation system for the third and forth cycles 24 because of the failure 11, 12 or 13 are wrong. As a result, the accumulated availability obtained by the accumulated function 26 will be inaccurate; it will indicate a lower accumulated availability than the actual one.

For the sake of completeness, it should be mentioned that there is, of course, a regular processing delay between the end of the time window in which datapoints 6 belonging to a calculation cycle 24 are received and the moment when the calculation result based on them, i.e. a QoS parameter, is obtained and added to the already accumulated QoS parameter. For simplicity, however, in FIGS. 4 and 5, the effect of a metric input value on the accumulated QoS parameter is shown to be an immediate one (for example, in FIG. 3, the value "D" in the datapoint 6 of metric adapter 5.2 in the second calculation cycle 24 is shown to decrease the accumulated QoS parameter in the same calculation cycle, whereas this will actually only happen in the next or subsequent calculation cycles.

Figure 5:
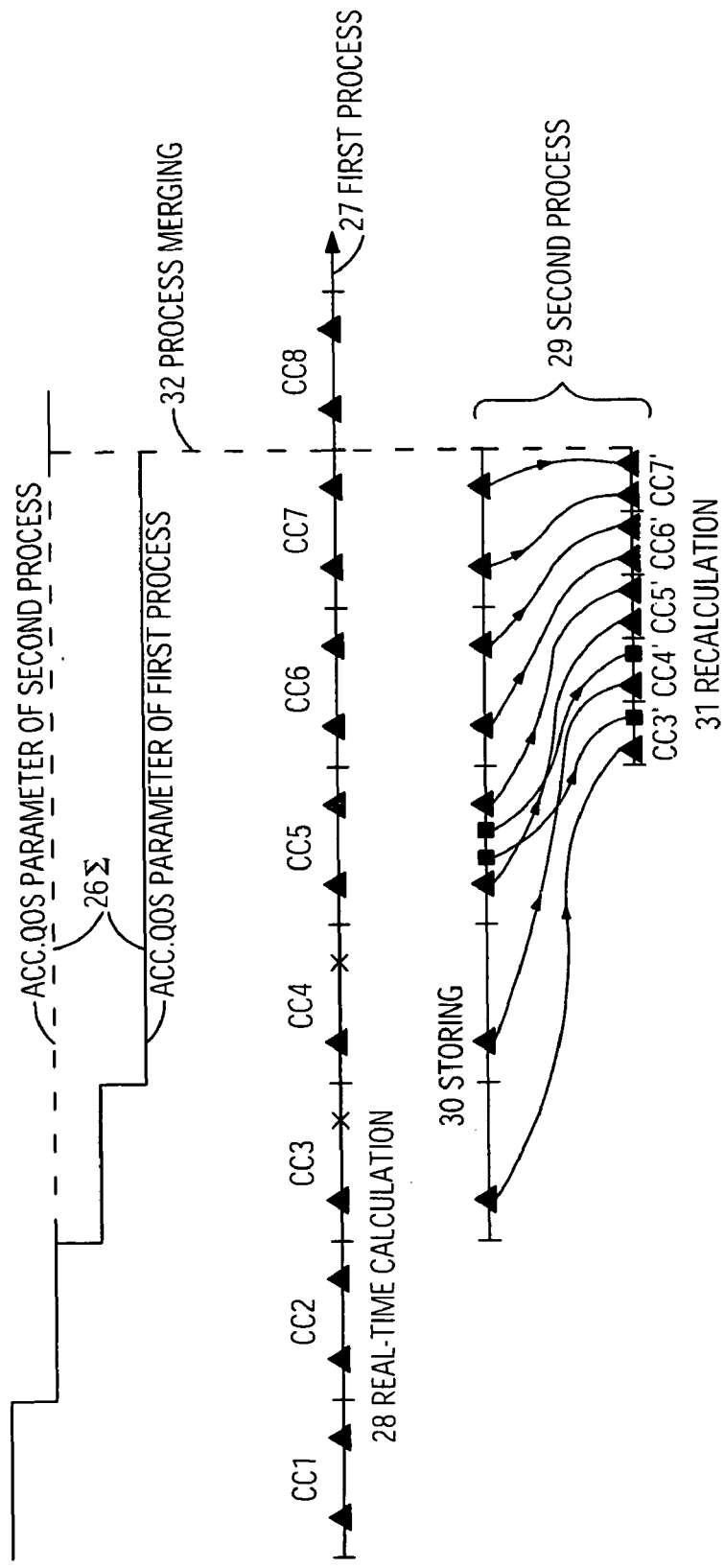
FIG. 5 illustrates a QoS determination process according to an embodiment of the invention in an exemplary situation similar to FIG. 4, but with a recalculation process.

FIG. 5: QoS Determination Process with Recalculation:

FIG. 5 illustrates a QoS determination process in the exemplary situation of FIG. 4, but now with a recalculation process. Two processes are shown in FIG. 5 as they proceed with time, a first process 27, which carries out a real-time calculation 28, as explained above in connection with FIG. 4, and a second process 29. As long as no data-source unavailability 11, 12, 13 has been observed, only the first process 27 is active, but the second process 29 has not yet been initiated (or is idle). In the example of FIG. 5, this applies to the first two calculation cycles, denoted by CC1 and CC2. The real-time calculation 28 calculates the QoS parameter for these calculation cycles CC1 and CC2, and the accumulation function 26 accumulates the QoS parameters. As in the example of FIG. 4, a data-source unavailability 11, 12, 13 is detected at the end of the second calculation cycle CC2, whereupon the second process 29 is started. Since the datapoints 6 of one of the metric entities which form the input of the calculation are not available (namely the datapoints from the second metric adapter 5.2), the second process 29 cannot immediately start with to recalculate; instead it performs preparatory activities for the recalculation be performed later when datapoints currently not available are received after the delay. For example, the second process 29 starts a storing sub-process 30 in which all the regular information needed to perform an accurate recalculation of the QoS parameters and the accumulated QoS parameters later are stored. In the present example, the undelayed datapoints 6 from the metric adapter 5.1 are stored. Furthermore, the last value of the accumulated QoS parameter, calculated by the first process 27, which was not affected by the data-source unavailability 11, 12, 13 is also stored; it is the start value of the accumulation to be carried out later by the second process 29. The two processes 27, 29 are concurrent processes.

The first process 27 continues carrying out the real-time calculation 28 in the following calculation cycles CC3, CC4, . . . and calculating the accumulated QoS parameter by means of the accumulation function 26, which will lead to a result which, on the one hand, is obtained in real-time, but on the other hand, is inaccurate due to the data-source unavailability 11, 122, 13 as explained in connection with FIG. 4.

In the present example, the unavailable data source (i.e. the metric adapter 5.2) becomes available again after the fourth calculation cycle CC4. The two datapoints 6 belonging to CC3 and CC4 which could not be transmitted in time and were therefore buffered in the buffer 9 of the metric adapter 5.2 are now transmitted to the data collector 7, as delayed datapoints during the fifth calculation cycle CC5, and are also stored by the storing sub-process 30. The storing sub-process 30 now also stores the new datapoints 6 from the metric adapter 5.2 which are now received in a regular manner, in the calculation cycles CC5 to CC7. As soon as all the delayed datapoints 6 have been received (i.e. at the beginning of the first process' sixth calculation cycle CC6), a further sub-process of the second process 29 is started, namely the recalculation process 31. In the recalculation process 31, the calculation cycles 24 since the occurrence of the data-source unavailability 11, 12, 13 (i.e. the calculation cycles CC3, CC4, ...) are recalculated. In this recalculation process, the stored regular information (i.e. the stored datapoints 6 from the first metric adapter 5.1) and the delayed metric data (i.e. the datapoints 6 from the second metric adapter 5.2 which have been buffered at the metric adapter 5.2 and then transmitted after the delay) are combined in a time-consistent manner such that those datapoints which belong to the currently calculated calculation cycle 24 in accordance with their timestamps, form the input to the calculation in each cycle 24. The QoS parameter obtained in each calculation cycle 24 is combined with the stored accumulated QoS parameters by using the accumulation function 26. Since the recalculation process 31 proceeds faster than the real-time calculation process 28, it needs less time to carry out a calculation cycle 24 and catches up with the real-time calculation process 28. In the example of FIG. 5, it needs a time period corresponding to two real-time calculation cycles 24 to recalculate five calculation cycles. In the example shown, in the first two calculation cycles after the second process' initialization (CC3 and CC4) the data from MA 5.2 are not available. During the third calculation cycle after the initialization (CC5) the data are transmitted to the data collector 7, so that the recalculation sub-process 31 is then started. The remaining two calculation cycles (CC6 and CC7) are needed for the recalculation sub-process 31 to catch up with the real-time calculation process 28. Consequently, although all the data belonging to three of the calculation cycles (CC5 to CC7) are received in a regular manner, these calculation cycles nevertheless form part of the recalculation sub-process 31, since the time from the beginning of CC5 to the end of CC7 has been needed to obtain the delayed data, to perform the recalculation and finally, to catch up with the real-time calculation process 28.

Finally, when the recalculation process 31 has caught up with the real-time calculation process 28 (i.e. at the end of calculation cycle CC7 in FIG. 5), process merging 32 of two processes 27, 29 is carried out. As a result, the accumulated QoS parameter which was calculated inaccurately by the first process 27 is replaced by the more accurate accumulated QoS parameter calculated by the second process 29. Furthermore, the QoS management system 1 proceeds with one of the two processes 27, 29, until another data-source unavailability 11, 12, 13 occurs. This is either achieved by synchronizing the first process 27 with the second process 29, and suspending the second process 29, or by replacing the first process 27 by the second process 29.

FIG. 6: QoS Determination Process with Asynchronous Data Sources:

In the embodiment of FIG. 6, the data sources are not clocked, but send their datapoints in an asynchronous manner. In such an asynchronous system, normally, a metric adapter 5 only sends a datapoint when an "event" has occurred, i.e. a change of the value of the metric entity associated with the metric adapter in question. For example, in FIG. 6 it is assumed that the metric adapters 5.1 and 5.2 deliver metric values representing the availability of network elements 3 associated with them. The network element 3 associated with the metric adapter 5.1 is available at $t_0$, becomes unavailable at $t_4$, available at $t_6$, unavailable at $t_{15}$ and available at $t_{20}$ (FIG. 6a). The network element 3 associated with metric adapter 5.2 is available at $t_0$, becomes unavailable at $t_2$, available at $t_7$, unavailable at $t_{13}$ and available at $t_{18}$ (FIG. 6b). Consequently, in the absence of a data-source failure 11, 12 or 13, the first metric adapter 5.1 sends datapoints at $t_0$, $t_4$, $t_6$, $t_{15}$ and $t_{20}$, and the second metric adapter 5.2 sends datapoints at $t_0$, $t_2$, $t_7$, $t_{13}$, $t_{18}$. Actually, as will be described below, a data source unavailability 11, 12, 13 pertaining to the second metric adapter 5.2 occurs from $t_4$ to $t_{13}$ so that datapoints referring to $t_6$ and $t_{13}$ are temporarily buffered at the metric adapter 5.2 and are only received at the data collector 7 after the delay, when the data-source is available again; in the example of FIG. 6 these two datapoints are received around $t_{15}$ and $t_{16}$ (FIG. 6b).

Since the datapoints 6 are generated in an event-driven, and therefore asynchronous manner, the QoS management system 1 cannot infer from the absence of datapoints that a data-source unavailability 11, 12, 13 has occurred (as may be done in a clocked system) rather, the absence of a datapoint may be, and will normally be, due to the absence of a datapoint-generating event. Therefore, in order to become aware of data-source unavailabilities 11, 12, 13, as they occur, a polling process 33 is permanently carried out in which the data sources are regularly polled by the QoS management system 1 in order to verify their availability. In such a "heartbeat polling", the QoS management system 1 periodically sends inquiries whether the data sources are available, and a polled data source returns a response indicating whether it is available or not. If a negative answer, or no answer, is received, the QoS management system 1 knows, or assumes, that the data source is unavailable. In the example of FIG. 6, negative polling responses are received from the second metric adapter 5.2 between $t_4$ and $t_{13}$, so that the QoS management system 1 is aware, in a real-time manner, that that data source has become unavailable during that time period (positive polling responses are drawn by shaded circles, whereas negative polling responses are drawn by plain circles). In some of the embodiments, polling is carried out once (or even several times) in each calculation cycle 24. In other embodiments, polling is carried out less frequently, for example every fifth calculation cycle. In some embodiments, a special treatment of events is performed which fall into the time interval between the occurrence of a data-source failure and its delayed detection, as will be described in connection with FIG. 11 below. Of course, the longer the polling response latency is and the smaller is the polling period is, the more frequently such events will occur.

Figure 6A:
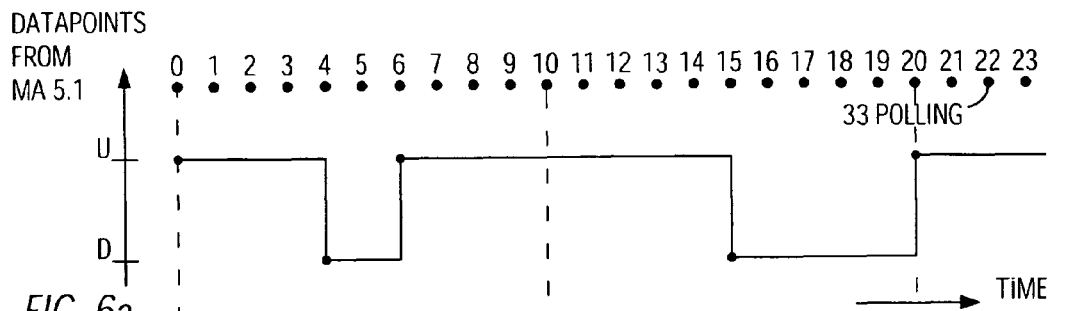
FIGS. 6a-e illustrate another embodiment of the invention with asynchronous data sources.
Figure 6B:
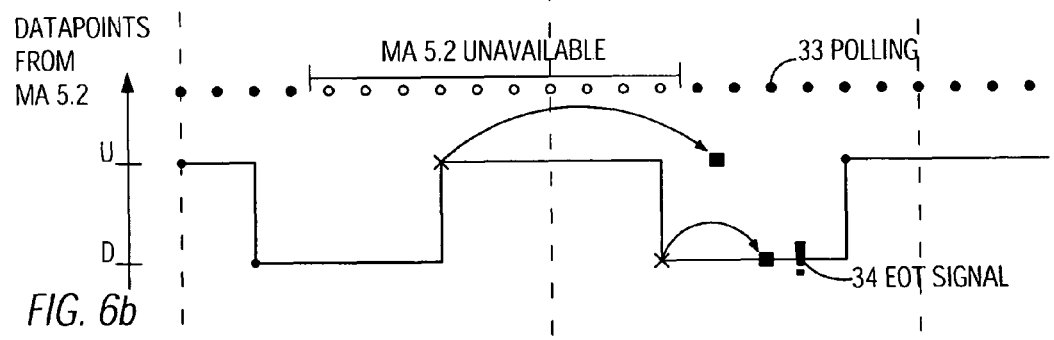
Figure 6C:
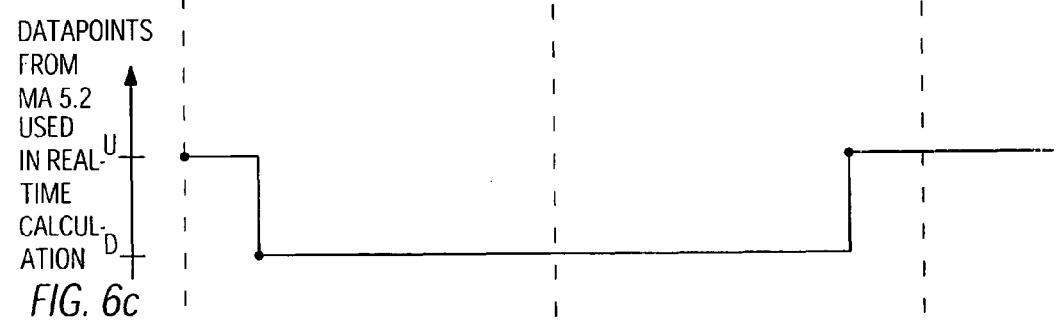

As mentioned above, the datapoints 6 generated during the unavailability period are transmitted when the data source is available again, for example around $t_{15}$ and $t_{16}$. Due to the asynchronous nature of datapoint generation, the QoS management system 1 does not know how many datapoints 6 have been generated during an unavailability period and thus, strictly speaking cannot infer from datapoints received with a delay whether the received datapoints are all the datapoints that have been delayed (in contrast to a clocked system in which such an inference is possible). Therefore, after the transmission of the last datapoint 6 which was buffered during the unavailability period, the metric adapter in question (i.e. the metric adapter 5.2 in the example of FIG. 6) sends an end-of-transmission (EOT) signal 34 (FIG. 6b). In some of the embodiments, the EOT signal 34 is also sent in an asynchronous manner, after the dispatch of the last buffered datapoint 6. In other embodiments, the data collector 7 of the QoS management system 1 sends an EOT request 34 to the metric adapter 5.2 if it assumes that is has received all buffered datapoints 6 (for example, after a certain waiting time since the last received buffered datapoint has elapsed) and the metric adapter 5.2 returns the EOT signal 34 in response to the EOT request.

As in the exemplary embodiment of a clocked system (FIG. 5), only those datapoints 6 which are regularly received are used in the first process' 27 real-time calculation 28 of FIG. 6. That is, the datapoints 6 from metric adapters 5.2 generated during the unavailability period at $t_7$ and $t_{13}$ are not used in the real-time calculation 28. Consequently, the only datapoints 6 from the second metric adapter 5.2 used in the real-time calculation 28 are the ones generated at $t_0$, $t_2$ and $t_{18}$. The real-time calculation 28 therefore assumes that the network element 3 associated with the second metric adapter 5.2 was unavailable during the whole period from $t_2$ to the beginning of $t_{18}$, as indicated in FIG. 6.

Figure 6D:
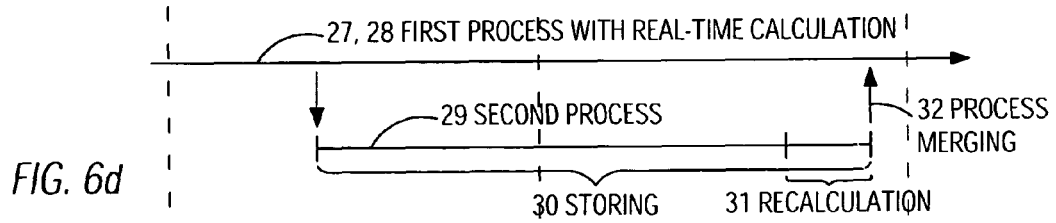

The second process 29 is started as soon as a data-source unavailability 11, 12, 13 is observed by the polling process 33, i.e. at $t_4$ as shown in FIG. 6*d*. As explained in connection with FIG. 5, the second process 29 includes a storing sub-process 30 which stores the regular data (i.e. the datapoints from the available metric adapter 5.1 and/or intermediate calculation results from the real-time calculation 28) as well as the delayed and undelayed datapoints from the temporarily unavailable metric adapter 5.2, from the beginning to the end of the second process 29. As soon as the EOT signal 34 is received, a further sub-process, the recalculation process 31, begins. When the recalculation 31 has caught up with the real-time calculation 28, the two processes are merged, at 32, as explained in connection with FIG. 5.

Figure 6E:
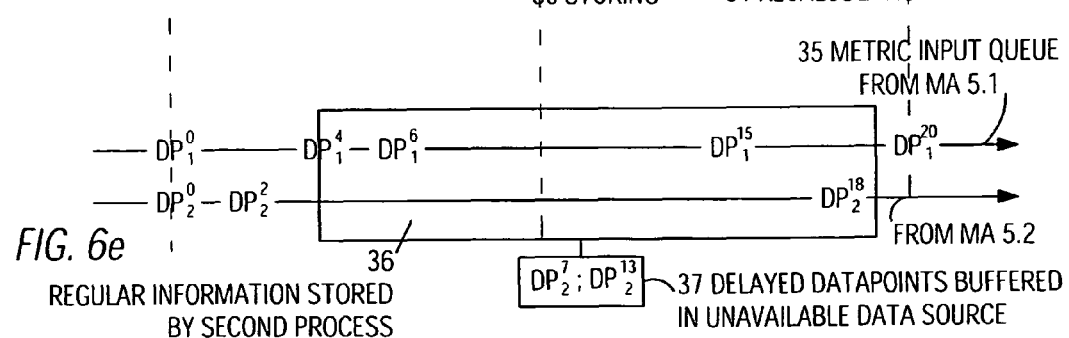

The input queue of metric values for the real-time calculation 28, called "metric input queue" 35 is illustrated in FIG. 6*e*. As mentioned above, the metric input queue 35 includes datapoints from $t_0$, $t_4$, $t_6$, $t_{15}$, $t_{20}$ from metric adapter 5.1, datapoints from $t_0$, $t_2$, $T_{18}$ from metric adapter 5.2. The regular information stored by the second process 29 and used in the recalculation 31 is denoted by "36", in the example of FIG. 6*e* it includes the undelayed datapoints from both metric adapters generated from the beginning to the end of the second process 29, i.e. the datapoints from the first metric adapter 5.1 generated at $t_4$, $t_6$, $t_{15}$ and the datapoint from the second metric adapter 5.2 generated at $t_{18}$ (in other embodiments, the regular information includes intermediate results of the real-time calculation, as will be explained in connection with FIGS. 8*d* an 9*b*). The second source of input to the recalculation 31 are the delayed datapoints 37 which are buffered in the temporarily unavailable data source, i.e. the datapoints from the second metric adapter 5.2 generated at $t_7$ and $t_{13}$.

Figure 7:
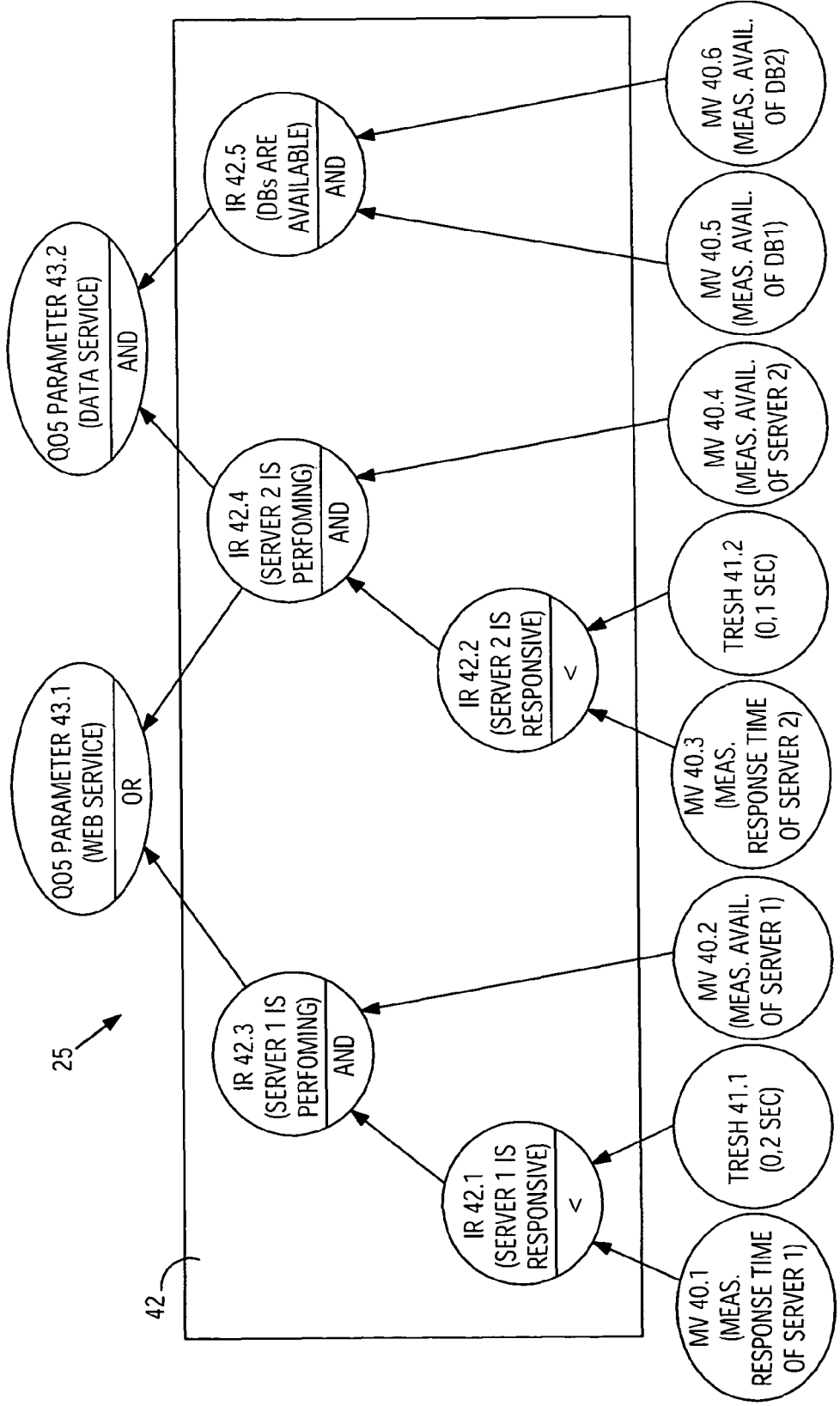
FIG. 7 is an exemplary calculation graph representing a calculation process of an embodiment.

FIGS. 7-9: Calculation Graphs, Storage of Regular Information and Partial Calculation in the Recalculation Process:

FIG. 7 illustrates an exemplary calculation graph 25 which represents the calculations made in each calculation cycle 24 (FIGS. 3-6) of the real-time calculation process. In some of the embodiments the same calculation graph is also used in the recalculation process, in other embodiments, however, only a part of it is used in the recalculation process, as will be explained in connection with FIG. 8.

The calculation graph 25 has different levels of nodes: the lowest-level nodes are metric values 40 (called "MV" in FIG. 7) which are "injected" into the calculation graph 25 in each calculation cycle. Nodes at the intermediate level represent the intermediate results (called "IR" in FIG. 7) which are obtained in the course of the calculation process in each calculation cycle. The IR-nodes 42 also include an operator (for example <, >, =OR, AND, etc.) which defines the way in which the entities that enter the node are combined. The highest-level nodes (which may also include an operator, as the intermediate nodes 42) are the results of the calculation process in each calculation cycle, the QoS parameters 43. Furthermore, there may be thresholds 41 to which the metric values 40 or intermediate results 42 are compared; the thresholds 41 may therefore be considered as lowest-level or intermediate-result nodes (of course, a simple calculation graph may only have lowest-level nodes and result nodes but no intermediate-result nodes).

The graph 25 is directed; the direction of the links between the nodes indicating the propagation of metric values 40, thresholds 41 and intermediate results 42 during the calculation process. The calculation starts at the lowest level with the "injection" of the metric values 40 and thresholds 41 and with the calculation of the first results, governed by the directed links of the graph 25 and the operators included in the nodes to which the directed links lead. The intermediate results 42 obtained are further propagated and combined in this manner with other intermediate results 42, metric values and/or thresholds 41, until the uppermost level is reached and the QoS parameters 43 are calculated. The QoS parameters 43 are finally accumulated over time, as described above in connection with FIGS. 3 to 5.

In simple cases, the graph 25 may have a tree-like structure in which, when propagating from the bottom to the top, there are no branches. Generally, however, the calculation graph 25 may have branches, as shown in FIG. 7. In this example, four metric values are injected: MV 40.1 (e.g. a measured response time of a first server, called "Server 1"), MV 40.2 (e.g. the measured availability of the Server 1), MV 40.3 (e.g. the measured response time of a second server, called "Server 2"), MV 40.4 (e.g. the measured availability of Server 2), MV 40.5 (e.g. the measured availability of a first database (called "DB1") and MV 40.6 (e.g. the measured availability of a second database, called "DB2"). An exemplary first threshold 41.1 is "0.2 sec", and a second threshold 41.2 is "0.1 sec". At IR 42.1 it is determined whether Server 1 is responsive by comparing the numerical metric value MV 40.1 with the first threshold 41.1 using the operator "<"; the result is a logical value. Analogously, at IR 42.2 it is determined whether Server 2 is responsive by comparing the numerical metric value MV 40.3 with the second threshold 41.2. At IR 42.3 it is determined whether Server 1 is performing by determining a logical AND of the result of IR 42.1 and the logical metric value MV 40.2. The same is done to determine whether Server 2 is performing at IR 42.4 by combining the result of IR 42.2 and metric value MV 40.4. At IR 42.5 it is determined whether the combined databases are available by forming a logical AND of the metric values MV 40.5 and 40.6.

Finally, in the example of FIG. 7 it is assumed that two QoS parameters are determined from the intermediate results IR 42.3 to 42.5: a first QoS parameter 43.1 indicates, for example, that a Web service which can alternatively be provided by Server 1 or Server 2 is available and has a minimum performance. The QoS parameter 43.1 is therefore a logical OR of IR 42.3 and IR 42.4, which indicate the availability and performance of the individual servers, but it does not depend on IR 42.5 which indicates the combined-database availability. By contrast, the second QoS parameter 43.2 is assumed to indicate the availability and performance of a data service which relies on server 2 (but not on server 1) and the databases DB1 and DB2. Consequently, in the example of FIG. 7, the QoS parameter 43.2 is formed by a logical AND of IR 42.4 and IR 42.5, but does not depend on IR 42.3.

In the exemplary calculation-graph structure of FIG. 7, an unavailability of the data source delivering the metric value MV 40.3 or MV 40.4 may cause both QoS parameters 43.1 and 43.2 calculated in the real-time calculation to be inaccurate, so that both QoS parameters 43.1 and 43.2 are to be recalculated in the recalculation process when the data source is available a gain and delivers the delayed datapoints which occurred during the unavailability period. By contrast, an unavailability of one of the data sources, which delivers MV 40.1, MV 40.2, MV 40.5 or MV 40.6 will only influence one of the QoS parameter, 43.1 or 43.2. In the latter cases, it is therefore, in principle, sufficient to recalculate only the single QoS parameter concerned, i.e. 43.1 or 43.2.

FIGS. 8*a* to *d* illustrate a calculation graph in a more abstract manner in which threshold nodes and operators are not drawn and in which the nodes drawn are denoted by capital letters "A" to "P". The nodes A and B are QoS parameter nodes 43, the nodes C to J are intermediate-result nodes 42, and the nodes K to P are metric-value input nodes 40. The graph 25 of FIG. 8 is not identical with the more detailed example of FIG. 7 (e.g. it has seven intermediate value nodes 42 whereas FIG. 7 has only five such nodes), but is similar to it since it is also a branched graph in which some of the metric-value input nodes 40 (namely nodes K, L, M and nodes O, P) influence only one of the QoS-parameter nodes 43, whereas other nodes (namely node N) influences both QoS parameter nodes 43.

Let us now assume that one of the data sources becomes temporarily unavailable, namely the data source delivering the metric values to the metric-value node L, for example due to a failure 11, 12 or 13 (FIG. 1). This is indicated by an arrow pointing to node L throughout the FIGS. 8*a* to *d*.

Figure 8A:
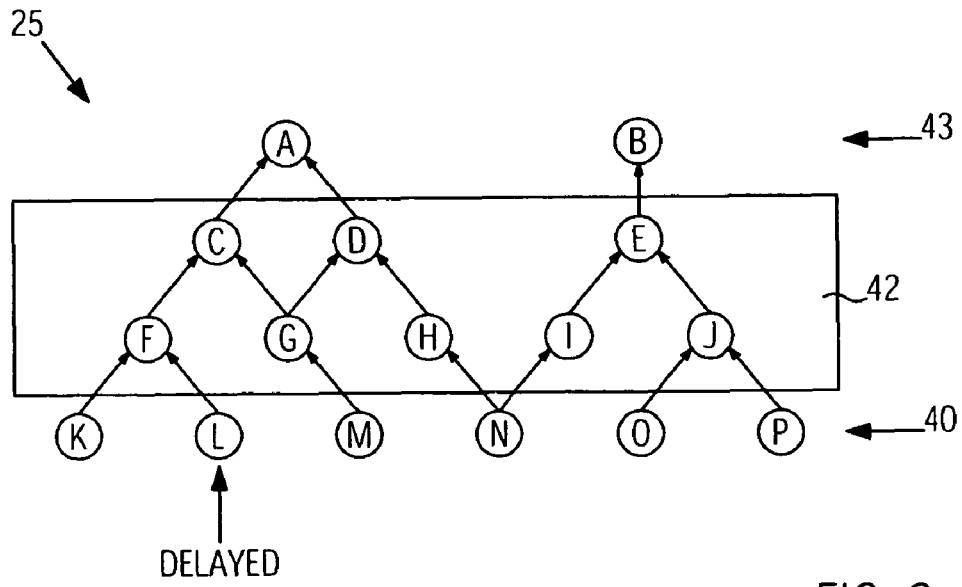
FIGS. 8a-d show calculations graphs illustrating what regular information is stored in different embodiments.
Figure 8B:
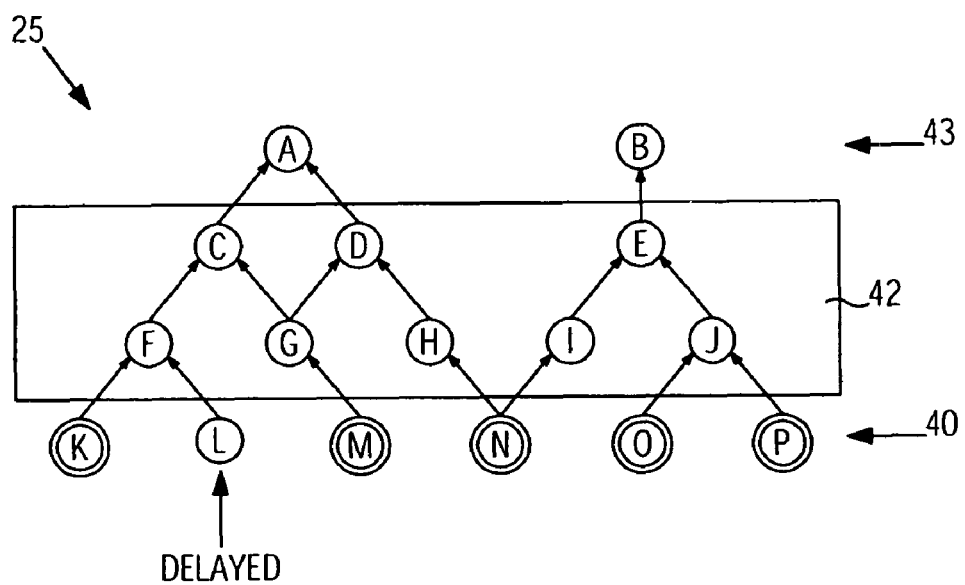
Figure 8C:
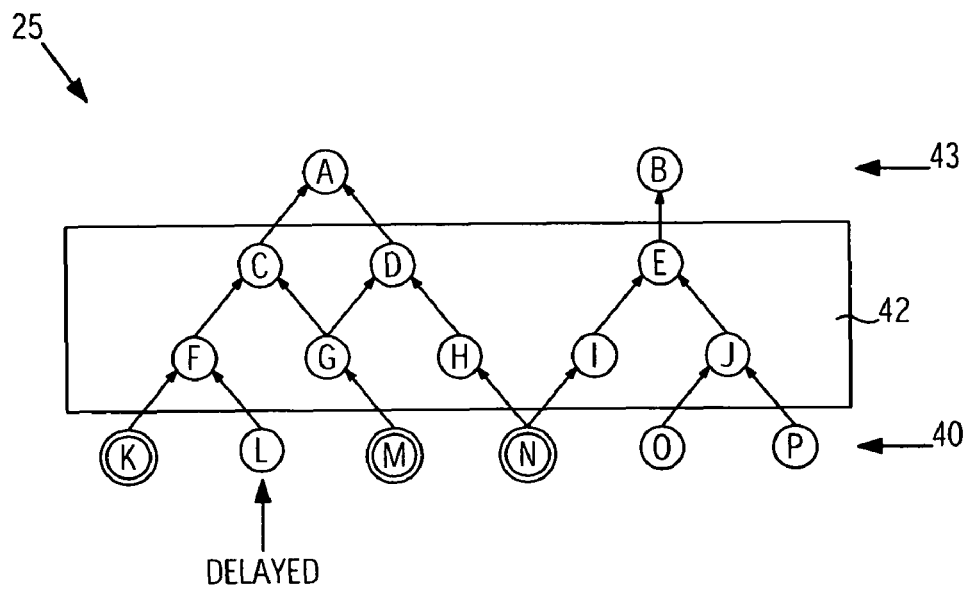
Figure 8D:
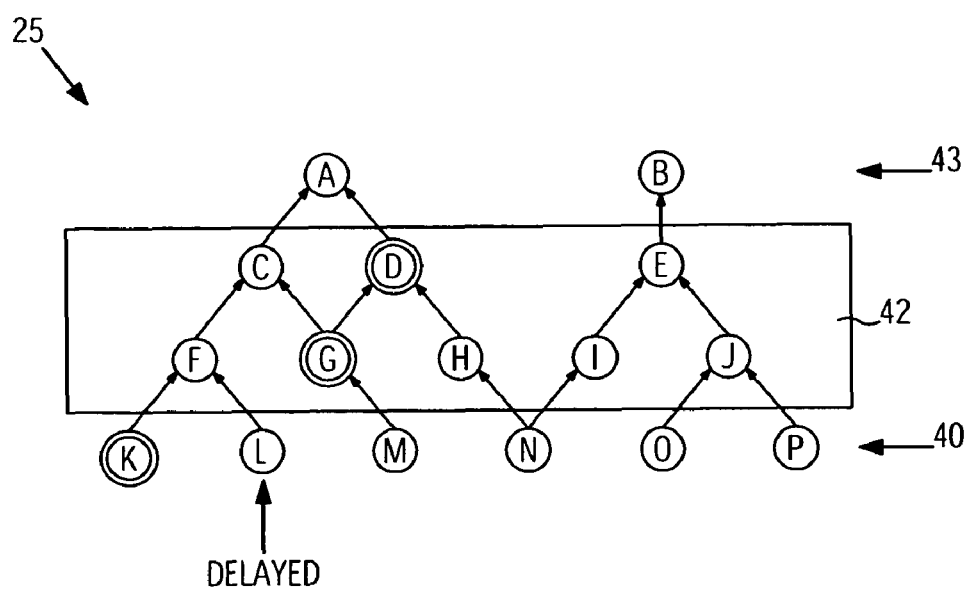

FIGS. 8*b* to *d* illustrate what regular information is then stored in the different embodiments. Throughout FIGS. 8*b* to *d*, those nodes which represent intermediate results or datapoints which are stored are drawn as double circles.

FIG. 8*b* illustrates embodiments in which all the regularly transmitted datapoints K, M to P are stored, irrespective of whether all these datapoints are actually needed in the recalculation process, or not. In some of these embodiments, these datapoints are always stored, i.e. even in the absence of a data-source failure, whereas in other embodiments they are only stored as long as the second process is active, i.e. after the detection of the data-source failure and before the termination of the second process. Of course, as shown in FIGS. 5 and 6, the datapoints from the temporarily unavailable data source corresponding to node L are also stored when the data source has become available again (this applies also to the following FIGS. 8*c* and *d*).

FIG. 8*c* illustrates another embodiment which is similar to FIG. 8*b* in that the regular information stored is made up regularly received datapoints (rather than intermediate results). However, in contrast to FIG. 8*b*, not all the regularly received datapoints are stored, but only those which are required in the recalculation process to recalculate the QoS parameter affected by the data-source failure. In the example of FIG. 8*c* the data-source failure only affects the QoS parameter node A, so that only the regularly received datapoints from the nodes influencing the QoS parameter node A, i.e. the datapoints represented by the nodes K, M and N are stored. This example shows that the definition of what belongs to the regular information to be stored depends selectively on which data source fails, in particular case. Therefore, the first activity of the second process, after its initialization, is to determine what belongs to the regular information to be stored, for example, based on predetermined rules. The activity of storing the regular information only starts upon the detection of the data-source failure and the determination of what to store.

FIG. 8*d* illustrates a still further embodiment in which the regular information stored is made up of intermediate results, as far as they can be used in the recalculation process. In the example shown, the intermediate results represented by nodes D and G are stored. In some cases, storing of intermediate results may not sufficient, but datapoints are also included in the regular information stored, to enable the QoS parameter affected by the data-source failure to be recalculated. For example, in FIG. 8*d* the datapoints represented by the metric-input-value node K are also stored since they influence the first intermediate result represented by the node I (this result can only be recalculated upon the receipt of the delayed datapoints represented by node L). As in the case of FIG. 8*c*, the definition of what intermediate results and/or datapoints belong to the regular information to be stored generally depends on which of the data sources has failed. Upon the detection of the data-source failure, the second process first determines which intermediate results and/or datapoints are to be stored to enable the affected QoS parameter to be recalculated, and then the actual storing process begins.

Figure 9A:
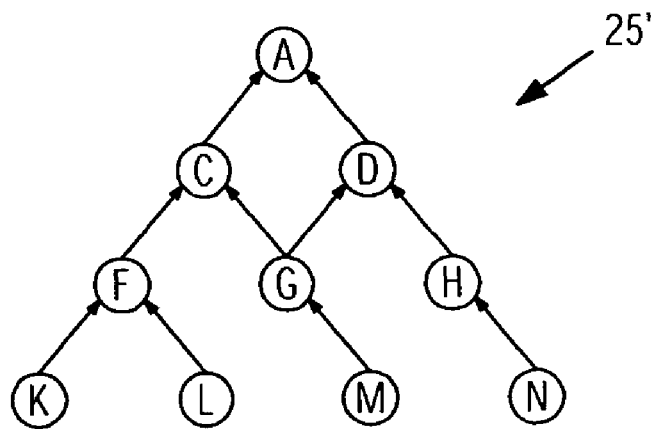
FIGS. 9a and b show partial calculation graphs used in embodiments of the recalculation process.

In embodiments in which all the datapoints are stored, such as in FIG. 8, the recalculation performed in the second process may (but does not necessarily have to) recalculate the complete calculation graph 25 used in the real-time calculation of the first process, now also using the datapoints transmitted after the delay which were not included in the first process' real-time calculation. For example, in such an embodiment, the calculation graph 25 of FIG. 8 *b* is both used in the first process' real-time calculation and the second process' recalculation. In other embodiments, however, only some of the calculations of the real-time calculation are repeated in the recalculation process, then including the datapoints received after the delay; consequently, the calculation graph representing the calculations made during the recalculation process is a partial graph of the first process' calculation graph 25. FIGS. 9*a* and *b* illustrate two such partial calculation graphs, denoted by 25' and 25". The first example, partial calculation graph 25' of FIG. 9*a*, pertains to the embodiment shown in FIG. 8*c* in which only the datapoints which influence the QoS parameter that is affected by the data-source unavailability, i.e. the datapoints represented by the nodes K, M and N are stored. Consequently, the partial calculation graph 25' is only that part of the first process' calculation graph 25 which is associated with the affected QoS parameter A, but does not include those nodes and links which are only associated with the other, unaffected QoS parameter B (i.e. does not include nodes B, E, I, J, O, P and their links).

Figure 9B:
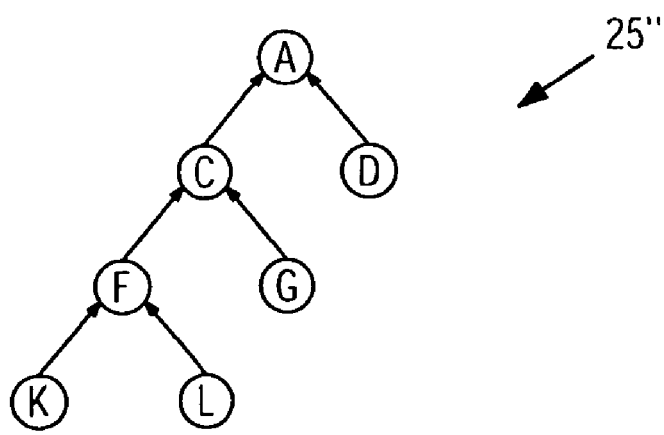

The second embodiment of a partial calculation graph 25" shown in FIG. 9*b* pertains to the embodiment of FIG. 8*d* in which intermediate results are stored. The partial calculation graph 25" is that part of the first process' complete calculation graph 25 which represents the regular information stored (i.e. the intermediate-result nodes G and D as well as the metric-input-value node K), the datapoints transmitted the delay (i.e. node L), and all the nodes representing intermediate and final results calculated therefrom (i.e. the nodes F, C and A) as well as the links between all these nodes.

Figure 10A:
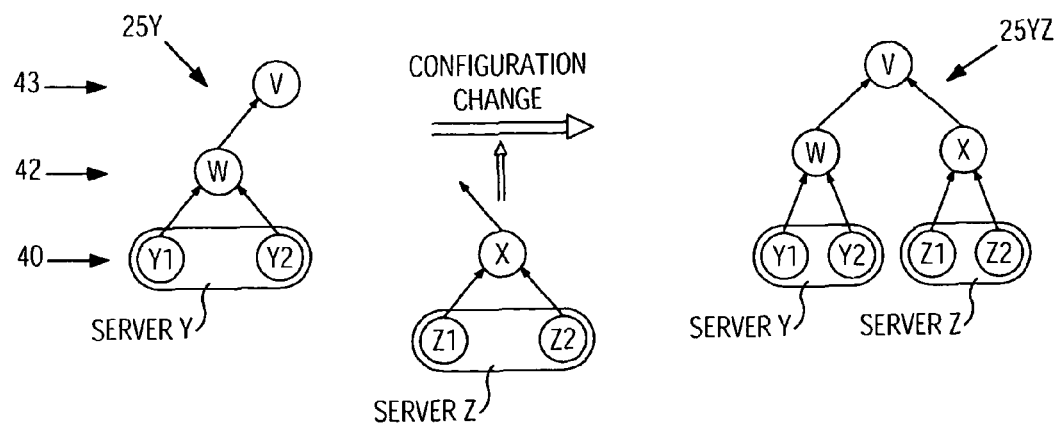
FIGS. 10a and b illustrate the handling of configuration changes according to embodiments.

FIG. 10: Handling of Configuration and Schedule Changes:

An exemplary calculation graph 25Y is shown at the left-hand side of FIG. 10*a*. The calculation graph 25Y has two input metric values Y1 and Y2 which may, for example, relate to the availability and latency of a server Y. A QoS parameter V is calculated from the input metric values Y1 and Y2. For example, the QoS parameter V may represent a quality of service delivered by the server Y. It is assumed, in the example of FIG. 10*a*, that, at some point of time, a configuration change occurs according to which another server, denoted as "server Z" is added. Let us assume that the server "Z" also delivers the service V. The configuration change is modeled, at the level of the calculation graphs, by an extension of the original calculation graph 25Y. The resulting extended calculation graph is the calculation graph 25YZ at the right-hand side of FIG. 10a. For example, the calculation graph 25YZ has two additional input metric values, Z1 and Z2, which also affect the calculated QoS parameter V. The QoS parameter V may be a logical OR of the intermediate results W and X, similar to the QoS parameter 43.1 shown in FIG. 7.

Figure 10B:
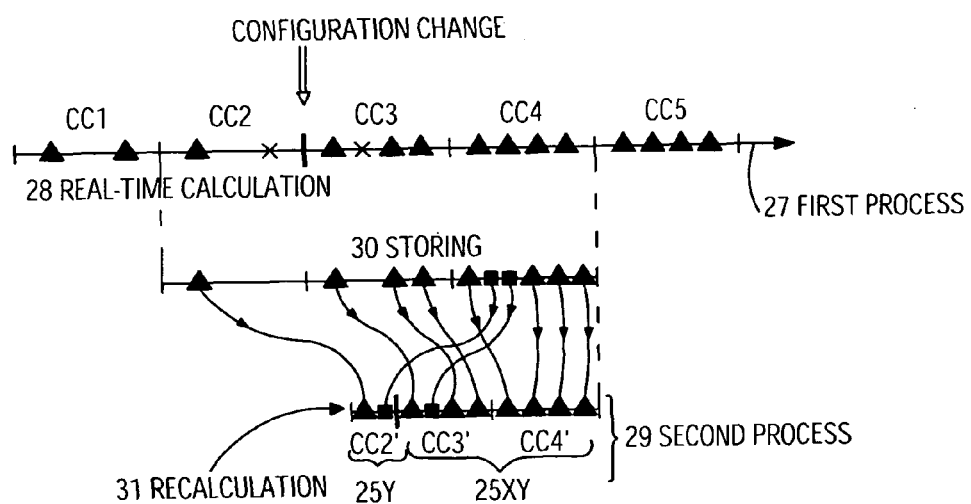

FIG. 10b, which is a diagram similar to FIG. 5, illustrates the use of the different calculation graphs 25Y and 25YZ in a time-consistent manner. The configuration change occurs between the second and third calculation cycles, CC2 and CC3. Consequently, in the first process 27 performing the real-time calculation 28 two input metric values are shown in the calculation cycles before the configuration change, CC1 and CC2, but four input metric values are shown in the calculation cycles after the configuration change, CC3 to CC5. It is assumed in FIG. 10b that a data-source failure happens during CC2 and CC3, as a result of which the second process 29 is started with the storing sub-process 30 at the beginning of CC2, and the datapoints which would normally be delivered from the now unavailable data source are temporarily buffered at this data source. The recalculation-sub-process 31 is started when the buffered datapoints which were not be available in the real-time calculation 28 received at the data collector 7 (FIG. 1), for example at the beginning of the calculation cycle CC4. The recalculation sub-process 31 takes into account the configuration change in a consistent manner; i.e. it uses the first calculation graph 25Y in the recalculation CC2' of the calculation cycle CC2 (which is associated with the configuration before the configuration change), and uses the second calculation graph 25YZ in the recalculation CC3' and CC4' of the calculation cycles CC3 and CC4 (which are associated with the configuration after the configuration change). To this end, the storing sub-process not only stores datapoints and/or intermediate results, but also the configuration graphs 25Y, 25YZ used in the real-time calculation, for each calculation interval, either in a complete form or a partial form, as illustrated in connection with FIG. 9.

The functionality shown in FIG. 10 also applies to schedule changes. The commitments made in an SLA may vary over time according to a schedule. For example, the quality of service required may be higher during working hours than that during non-working hours. Different calculation graphs may be associated with the different schedules. A schedule change, which may, for example, occur each day at the end of the normal working hours is handled in a manner analogous to the handling of configuration changes in FIG. 10.

FIG. 11: Timestamp Modification:

FIG. 11, which is similar to FIG. 6, illustrates possible consequence of a "failure-awareness delay" 44. In the example of FIG. 11, it is assumed that three datapoints are generated by a metric adapter 5.2, a first datapoint at calculation cycle 0 indicating a status change "UP", a second one at calculation cycle 2 indicating a status change "DOWN", and a third one at calculation cycle 10 indicating a status change "UP" again. Further, it is assumed that the metric adapter 5.2 is unavailable during calculation cycles CC2 to CC12. However, in contrast to FIG. 6, we are now assuming that the QoS management system 1 does not immediately become aware of this data-source unavailability, but only with a delay (the "failure-awareness delay" 44 mentioned above) of, say, one calculation cycle. This may, for example, be due to delays inherent in the polling process 33. In FIG. 11a, this delay 44 is illustrated by the plain circles (which indicate negative polling responses) being shifted relative to the unavailability interval by one calculation cycle.

Figure 11A:
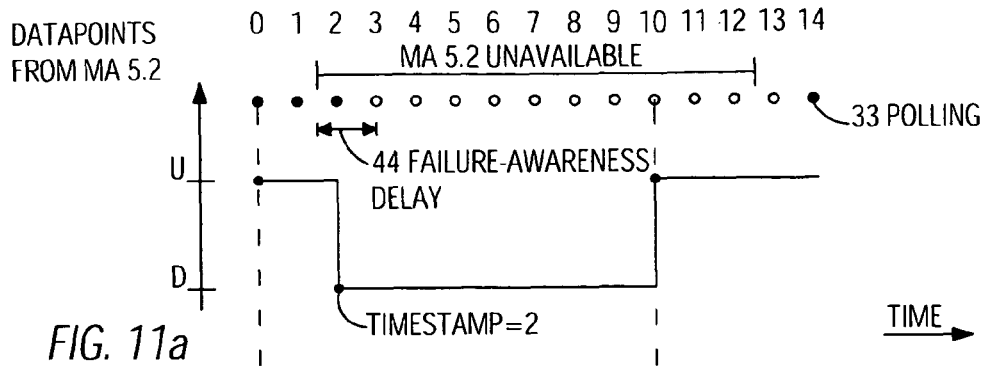
FIGS. 11a-d illustrate the process of timestamp modification according to some embodiments.
Figure 11B:
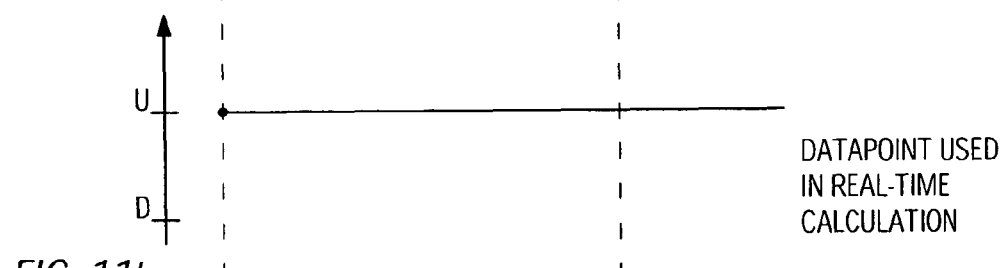

FIG. 11b illustrates what happens in this example in the real-time calculation: due to the unavailability of the metric adapter MA5.2, the datapoints with timestamps "2" and "10" are not transmitted in real-time, but are buffered at the metric adapter MA 5.2. Consequently, the real-time calculation has only the datapoint with timestamp "0" at its disposal, and therefore assumes that the metric value indicated by this datapoint remains valid; i.e. it assumes that the metric value is "UP" all the time.

Due to the failure-awareness delay 44, the second process starts to store the regular information only at calculation cycle 3, i.e. with a delay 44 corresponding to one cycle. In other words, the regular data belonging to calculation cycle CC2 are not stored, and the recalculation process carried out later will not recalculate calculation cycle CC2, but will only start with calculation cycle CC3.

Figure 11C:
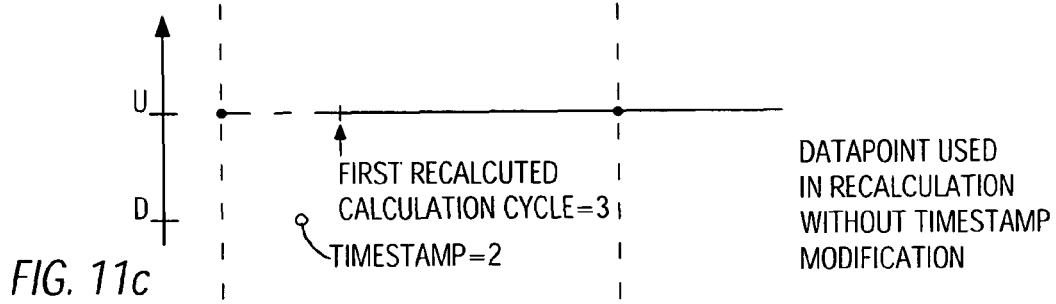

When the temporarily unavailable metric adapter MA 5.2 becomes available again, at calculation cycle CC13, it transmits its buffered datapoints, i.e. the datapoints with timestamps "2" and "10", to the data collector 7 (FIG. 1). The datapoint with the timestamp "2" was not used in the real-time calculation, due to the data-source unavailability, but the recalculation process is not prepared to digest this datapoint, either. This is due to the failure-awareness delay 44 which causes the recalculation to start only with calculation cycle CC3; the datapoint with the timestamp "2" can therefore not be consistently associated with any calculation cycle processed in the recalculation process. Consequently, as shown in FIG. 11c, without timestamp modification, this datapoint is ignored, and the recalculation process therefore assumes that the metric value is "UP" throughout the recalculation process, as indicated by the previous datapoint with timestamp "0".

Figure 11D:
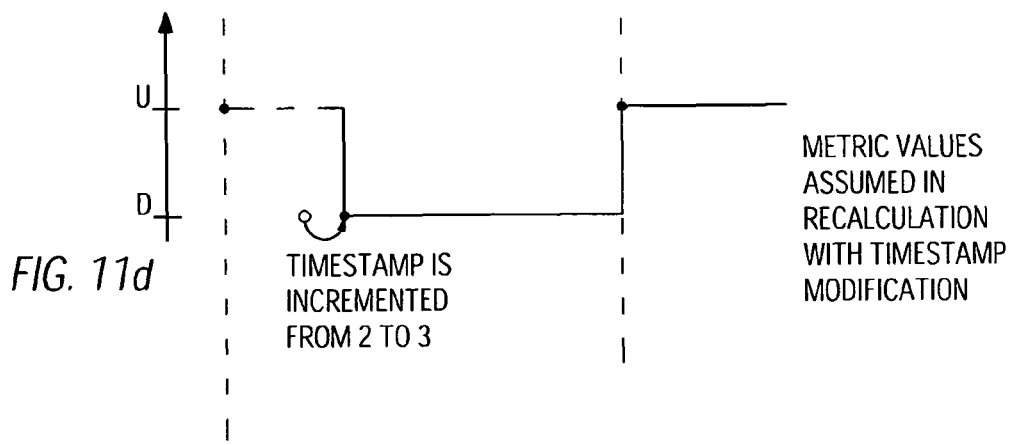

In some of the embodiments, however, a timestamp modification is performed in such cases, as illustrated in FIG. 11d. When a datapoint is received with a delay, and could therefore not be included in the real-time calculation any more, but, on the other hand, belongs to a calculation cycle lying before the first calculation cycle of the recalculation process, the timestamp of this datapoint is incremented such that the datapoint apparently belongs to the first calculation cycle processed in the recalculation process (a collision rule in case of conflicting datapoints may then resolve a collision; for example, the datapoint with the youngest original timestamp may be used). In the example of FIG. 11d the timestamp of the datapoint in question is incremented from "2" to "3". As can be seen from FIG. 11d, the result obtained with timestamp modification is more accurate than that without timestamp modification; the recalculation process does not fail to notice that the metric value change from "UP" to "DOWN" anymore. Rather, the failure-awareness delay 44 only causes a small inaccuracy, namely a delay of this change by one calculation cycle.

Figure 12:
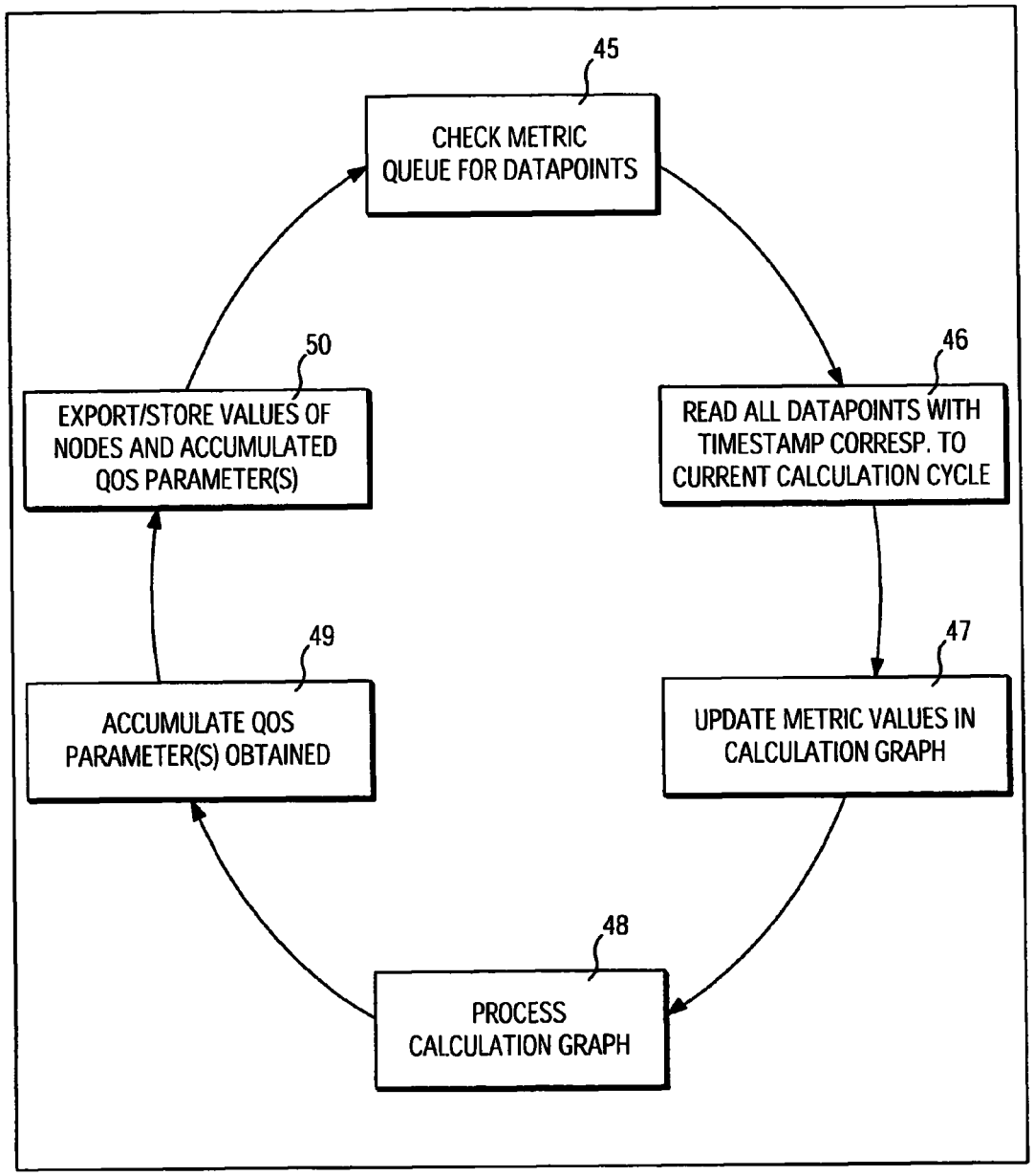
FIG. 12 is a state diagram of a calculation process according to an embodiment.

FIG. 12: State Diagram of Calculation Process:

FIG. 12 is a state diagram of the real-time calculation and recalculation processes 28, 31. It illustrates the states through which the first calculation engine 15 or second calculation engine 16 (FIG. 1) runs in each calculation cycle.

At 45, the metric queue 35 (FIG. 6) is checked for new datapoints. In the real-time calculation, the metric queue 35 only includes regularly transmitted datapoints. In the real-time calculation, however, the metric queue contains the regular information stored by the second process (i.e. stored regularly transmitted datapoints and/or stored intermediate results obtained in the real-time calculation) and the datapoints transmitted after a delay. At 45, all datapoints are read that have a timestamp which corresponds to the current calculation cycle. A datapoint is read only once from the metric queue and can normally not be read a second time from the data collector. At 47, the metric values in the calculation graph are updated with the values from the datapoints read in 46. At 48, the calculation graph with the updated metric values is processed, i.e. the calculations represented by the calculation graph are carried out. At 49, the QoS parameter, obtained as the result of 48 is added to the previous value of accumulated QoS parameter, so that a newly accumulated QoS parameter is obtained. At 50, the values of the nodes of the calculation graph, ore some of them, and the accumulated QoS parameter are exported to the data exporter 17 and/or the SLM server 19 (FIG. 1), are stored in the data warehouse 18 and/or the CMDB 21, and are monitored in the monitoring GUI 20. In the real-time calculation process, the values of the nodes and the accumulated QoS parameter are also exported to the second calculation engine which stores that part of the data which constitutes the "regular information" used in the recalculation process, as described above.

Figure 13:
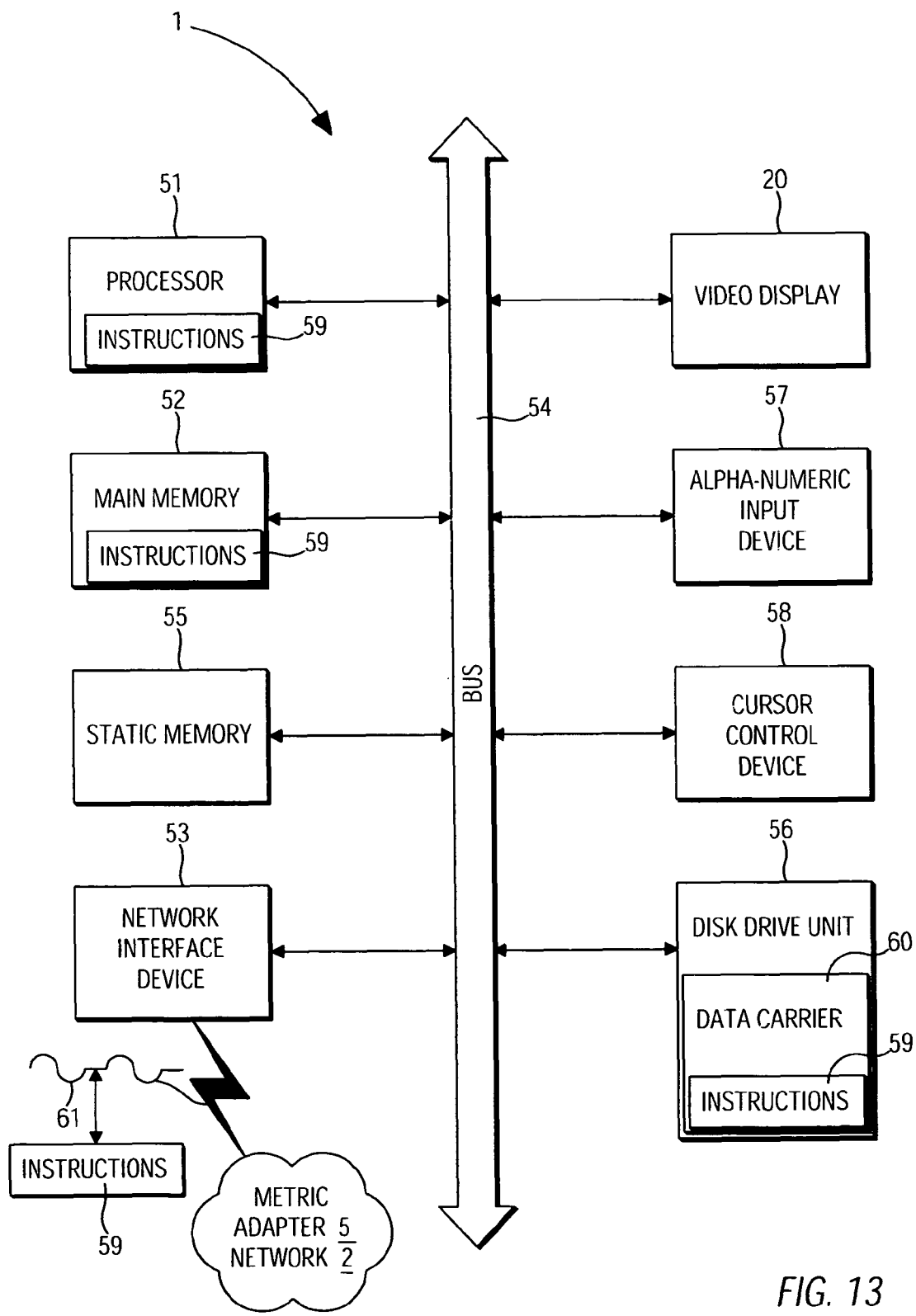
FIG. 13 is a diagrammatic representation of an embodiment of a QoS management computer system.

FIG. 13: QoS Management Computer System.

FIG. 13 is a diagrammatic representation of a computer system which provides the functionality of the QoS management system 1 of FIG. 1, and is therefore denoted as "QoS management computer system 1". Within the QoS management computer system 1 a set of instructions, for causing the computer system to perform any of the methodologies discussed herein, may be executed. The QoS management computer system 1 includes a processor 51, a main memory 52 and a network interface device 53, which communicate with each other via a bus 54. Optionally, it may further include a static memory 55 and a disk drive unit 56. A video display (the monitoring GUI) 20, an alpha-numeric input device 57 and a cursor control device 58 may form a QoS management user interface. The network interface device 53 connects the QoS management computer system 1 to the metric adapters 5 and the managed IT network 2. A set of instructions (i.e. software) 59 embodying any one, or all, of the methodologies described above, resides completely, or at least partially, in or on a machine-readable medium, e.g. the main memory 52 and/or the processor 51. A machine-readable medium on which the software 59 resides may also be a data carrier 60 (e.g. a non-removable magnetic hard disk or an optical or magnetic removable disk) which is part of disk drive unit 56. The software 59 may further be transmitted or received as a propagated signal 61 via the Internet and the IT network 2 through the network interface device 53.

Thus, the described embodiments of service level management tools enable both a real-time monitoring and an accurate indication of the quality of a service provided, even when data sources for metric values are temporarily unavailable.

All publications and existing systems mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method of determining quality of service (QoS) in an IT infrastructure on the basis of QoS-related data received from data sources for these QoS-related data, wherein the data from the data sources regularly arrive in real-time, but data from one or more of the data sources may occasionally be delayed, the method comprising:

a QoS management computer system calculating, on the basis of the regular data, a real-time indication of the quality of service in a first process for a calculation cycle, said indication not being based on delayed data;

the QoS management computer system calculating, after the receipt of delayed data, on the basis of regular information, which comprises at least one of regular data and information derived from it, and the delayed data, a delayed, but more accurate indication of the quality of service in a second concurrent process for the same calculation cycle.

2. The method of claim 1, wherein the activities of calculating comprise calculating QoS parameter values for short time-intervals, thus forming calculation cycles, and combining these QoS parameter values over time.

3. The method of claim 2, wherein the data sources provide their QoS-related data with a timestamp indicating the point of time when the data was generated, a data and its timestamp being called "datapoint", and wherein, at least in the second process, the datapoints are put in correct order and are combined based on their timestamps.

4. The method of claim 3, wherein, at least in the second process, only datapoints are combined in the calculation cycle which, due to their timestamp, belong to said calculation cycle.

5. The method of claim 3, wherein the timestamp of a delayed datapoint is incremented when the datapoint has been generated between the occurrence of the delay and its detection, so that the datapoint is used in the second process as if it had been generated after the detection of the delay.

6. The method of claim 2, wherein the calculation of QoS parameter values in the calculation cycles is based on a calculation graph indicating how the data from the data sources are to be combined.

7. The method of claim 6, wherein the second process is based on the complete calculation graph, or a part of the calculation graph, used in the first process.

8. The method of claim 6, wherein the first process reveals intermediate results, which are represented by nodes of the calculation graph, wherein some of the intermediate results are affected by a data source's non-availability, while other intermediate results are not affected by the data source's non-availability and are therefore correctly calculated in the first process, wherein non-affected intermediate results which influence other nodes in the calculation graph are buffered and are re-used in the second process, which is therefore based on a different calculation graph.

9. The method of claim 6, wherein the processes are arranged to handle schedule and configuration events which trigger the use of modified calculation graphs, wherein the modified calculation graphs are used in both the first and second process in a time-consistent manner.

10. The method of claim 1, wherein after the second process has caught up with the first process, the first process is synchronized with the second process, and the second process is suspended.

11. The method of claim 1, wherein after the second process has caught up with the first process, the second process replaces the first process.

12. The method of claim 1, wherein the data received from a data source are data the receipt of which is expected, since they are data periodically sent by the data source, or upon request from the QoS management system.

13. The method of claim 12, wherein the availability of a data source is ascertained by an inference mechanism and wherein, in response to a detected non-availability, the second process is triggered.

14. The method of claim 1, wherein the data received from a data source are event data asynchronously transmitted.

15. The method of claim 14, wherein a data sources is polled from time to time and thereby the availability of the data source is ascertained, and wherein, in response to a detected non-availability, the second process is triggered.

16. The method of claim 14, wherein, when data from a data source had been delayed, but could finally be transmitted, the data source sends an end-of-transmission indication that all delayed data have been transmitted.

17. A computer system for determining quality of service (QoS) in an IT infrastructure on the basis of QoS related data received from data sources for these QoS related data, wherein the data from the data sources regularly arrive in real-time, but data from one or more of the data sources may occasionally be delayed, the computer system being programmed to:
- calculate, on the basis of the regular data, a real-time indication of the quality of service in a first process for a calculation cycle, said indication not being based on delayed data;
- calculate, after the receipt of delayed data, on the basis of regular information, which comprises at least one of regular data and information derived from it, and the delayed data, a delayed, but more accurate indication of the quality of service in a second concurrent process for the same calculation process.

18. A computer program product which is in the form of a machine-readable medium with program code stored on it,
wherein the program code is arranged to carry out a method, when executed on a computer system, of determining quality of service (QoS) in an IT infrastructure on the basis of QoS related data received from data sources for these QoS related data, wherein the data from the data sources regularly arrive in real-time, but data from one or more of the data sources may occasionally be delayed, said method comprising:
- calculating, on the basis of the regular data, a real-time indication of the quality of service in a first process for a calculation cycle, said indication not being based on delayed data;
- calculating, after the receipt of delayed data, on the basis of regular information, which comprises at least one of regular data and information derived from it, and the delayed data, a delayed, but more accurate indication of the quality of service in a second concurrent process for the same calculation cycle.

* * * * *